United States Patent
Sakaguchi et al.

(10) Patent No.: US 10,015,127 B2
(45) Date of Patent: Jul. 3, 2018

(54) COMMUNICATION DEVICE AND COMPUTER-READABLE NON-TRANSITORY RECORDING MEDIUM WITH COMMUNICATION CONTROL PROGRAM RECORDED THEREON

(71) Applicant: KYOCERA Document Solutions Inc., Osaka (JP)

(72) Inventors: Shoichi Sakaguchi, Osaka (JP); Yoshihisa Tanaka, Osaka (JP); Yumi Hirobe, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 223 days.

(21) Appl. No.: 14/832,244

(22) Filed: Aug. 21, 2015

(65) Prior Publication Data

US 2016/0065506 A1 Mar. 3, 2016

(30) Foreign Application Priority Data

Aug. 28, 2014 (JP) .................................. 2014-174238

(51) Int. Cl.
*H04L 12/58* (2006.01)

(52) U.S. Cl.
CPC .............. *H04L 51/26* (2013.01); *H04L 51/28* (2013.01)

(58) Field of Classification Search
CPC ............ H04N 1/00209; H04N 1/32641; H04L 51/066; H04L 51/22; G06F 15/16

(Continued)

(56) References Cited

U.S. PATENT DOCUMENTS 6,857,007 B1 * 2/2005 Bloomfield ........ H04N 1/00209
358/402
8,209,390 B1 * 6/2012 Gibbs ..................... H04L 51/28
709/206

(Continued)

FOREIGN PATENT DOCUMENTS

JP H09-331350 A 12/1997
JP 2005-202891 A 7/2005

(Continued)

OTHER PUBLICATIONS

Notice of Reasons for Refusal mailed by Japan Patent Office dated Aug. 23, 2016 in the corresponding Japanese patent application No. 2014-174238.

*Primary Examiner* — Tesfay Yohannes
(74) *Attorney, Agent, or Firm* — IP Business Solutions, LLC

(57) ABSTRACT

A communication device includes an acceptance section, a mail data generating section, and a transmission section. The acceptance section is configured to accept a plurality of destination addresses and a mail text to be sent to the plurality of destination addresses. The mail data generating section is configured to generate, for every one of the plurality of destination addresses, mail data that contains the mail text, destination information indicating the one of the plurality of destination addresses as a destination, and destination address list information which indicates a list of the plurality of destination addresses arranged in order and in which the one destination address is placed higher in order than when accepted by the acceptance section. The transmission section is configured to send the mail data generated by the mail data generating section.

9 Claims, 24 Drawing Sheets

(58) Field of Classification Search
USPC .................................. 709/203, 206; 370/252
See application file for complete search history.

(56) References Cited

U.S. PATENT DOCUMENTS

| | | | |
|---|---|---|---|
| 2002/0091778 A1* | 7/2002 | Hosoi | H04L 51/066 |
| | | | 709/206 |
| 2003/0031197 A1* | 2/2003 | Schmidt | G06F 13/1657 |
| | | | 370/462 |
| 2006/0256731 A1* | 11/2006 | Jennings | H04L 12/2856 |
| | | | 370/252 |
| 2007/0011255 A1 | 1/2007 | Miyamoto | |
| 2008/0166991 A1* | 7/2008 | Izumikawa | G08B 21/0269 |
| | | | 455/404.2 |
| 2009/0193089 A1* | 7/2009 | Ochi | G06Q 10/107 |
| | | | 709/206 |
| 2010/0169425 A1 | 7/2010 | Kadokawa et al. | |
| 2012/0047213 A1* | 2/2012 | Hanada | H04L 51/066 |
| | | | 709/206 |
| 2012/0314713 A1* | 12/2012 | Singh | H04L 65/1069 |
| | | | 370/401 |
| 2013/0060708 A1* | 3/2013 | Oskolkov | G06Q 20/10 |
| | | | 705/75 |
| 2014/0333961 A1* | 11/2014 | Tsutsumi | G06T 11/60 |
| | | | 358/1.15 |

FOREIGN PATENT DOCUMENTS

| | | |
|---|---|---|
| JP | 2006-331003 A | 12/2006 |
| JP | 2007-267248 A | 10/2007 |

* cited by examiner

Fig.5A

| | |
|---|---|
| SENDER | Mr./Ms. *** <aaa@aaa.com> — d11 |
| ADDRESS (TO) | bbb@bbb.com, ddd@ddd.com, eee@eee.com, ccc@ccc.com — d12 |
| CC | — d13 |
| BCC | — d31 |
| SUBJECT | Regular Meeting — d14 |
| TEXT | Dear members of the sales department: — d15<br><br>I wish everyone the best of success in your business. I'm ***.<br><br>The regular meeting on next Monday will be held in the second meeting room at 13:00. I'd like to ask the person in charge to prepare materials.<br><br>Thank you for your attention! |

REPLY   BACK

| | | |
|---|---|---|
| SENDER | Mr./Ms. *** \<aaa@aaa.com\> | d11 |
| ADDRESS (TO) | ddd@ddd.com, bbb@bbb.com, eee@eee.com, ccc@ccc.com | d12 |
| CC | | d13 |
| BCC | | d31 |
| SUBJECT | Regular Meeting | d14 |
| TEXT | Dear members of the sales department:<br><br>I wish everyone the best of success in your business. I'm ***.<br><br>The regular meeting on next Monday will be held in the second meeting room at 13:00. I'd like to ask the person in charge to prepare materials.<br><br>Thank you for your attention! | d15 |

D2

REPLY    BACK

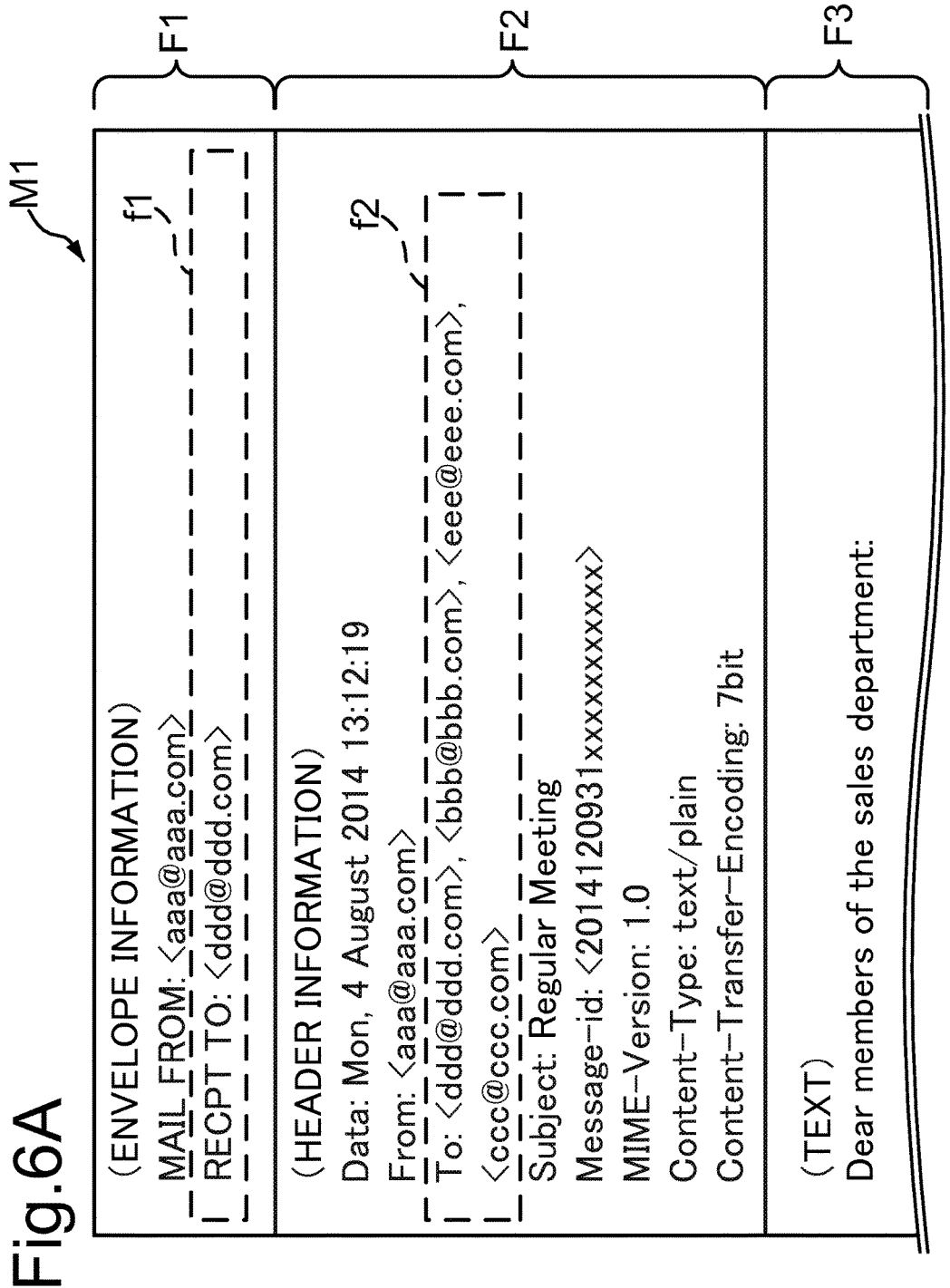

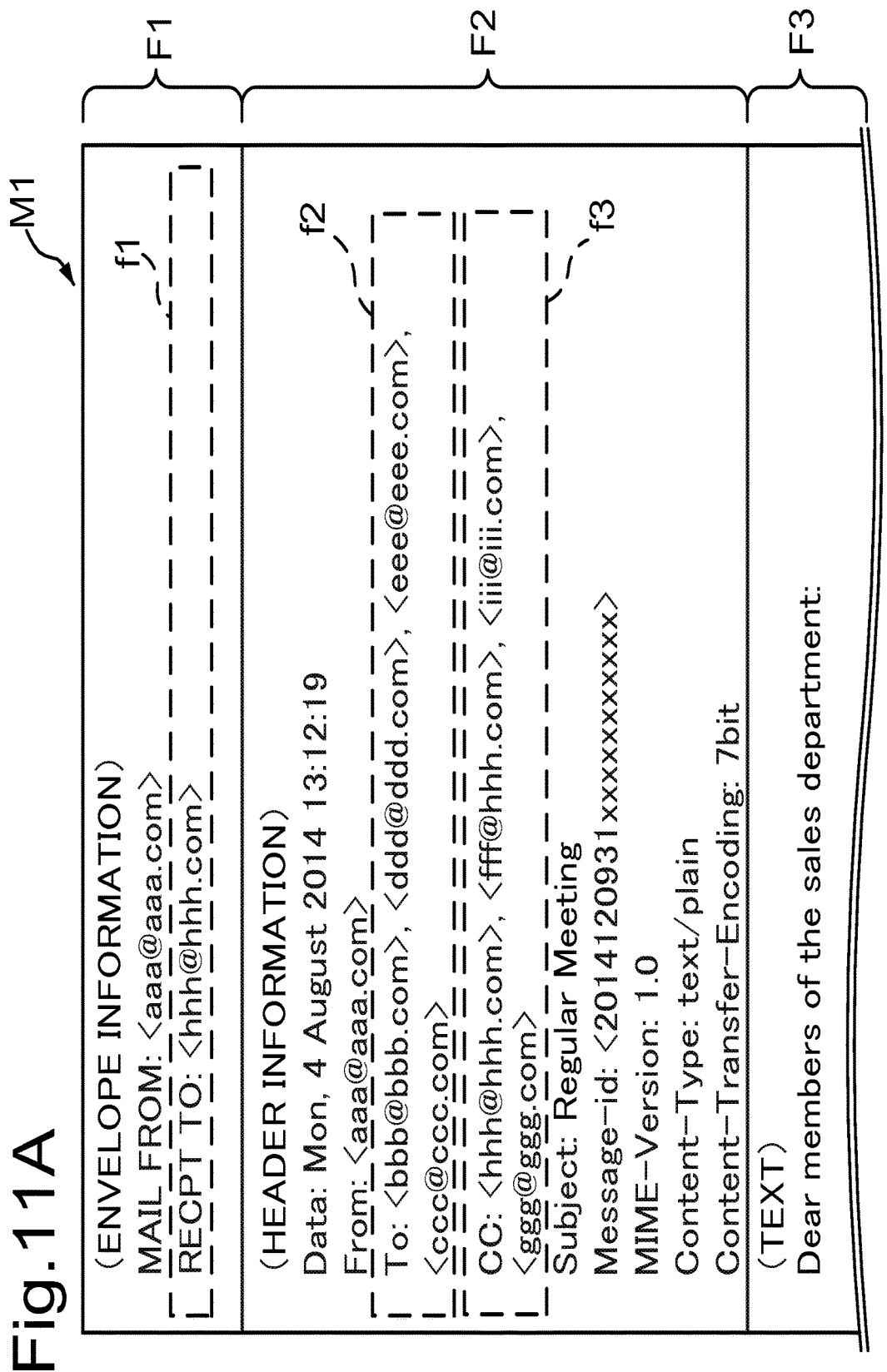

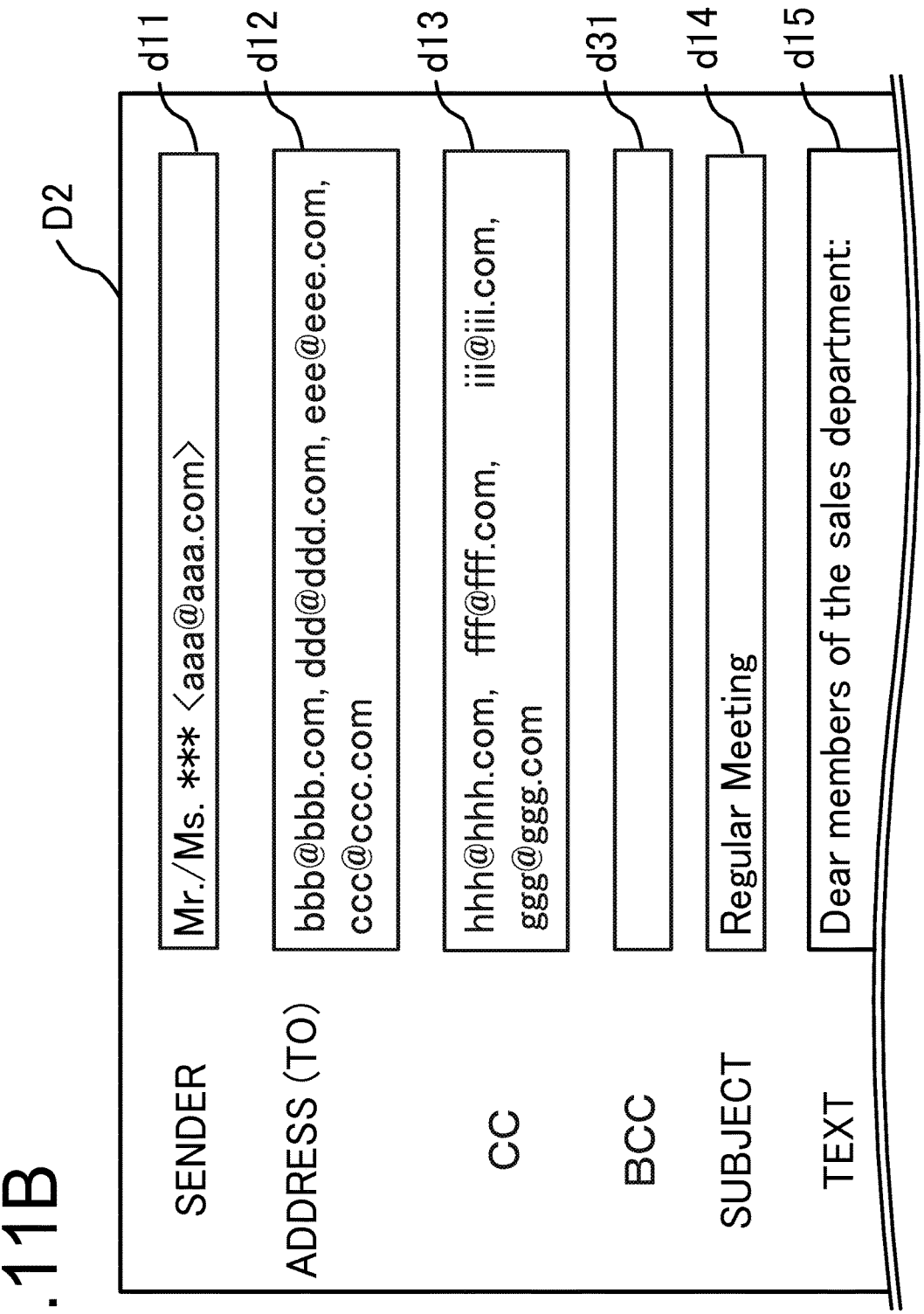

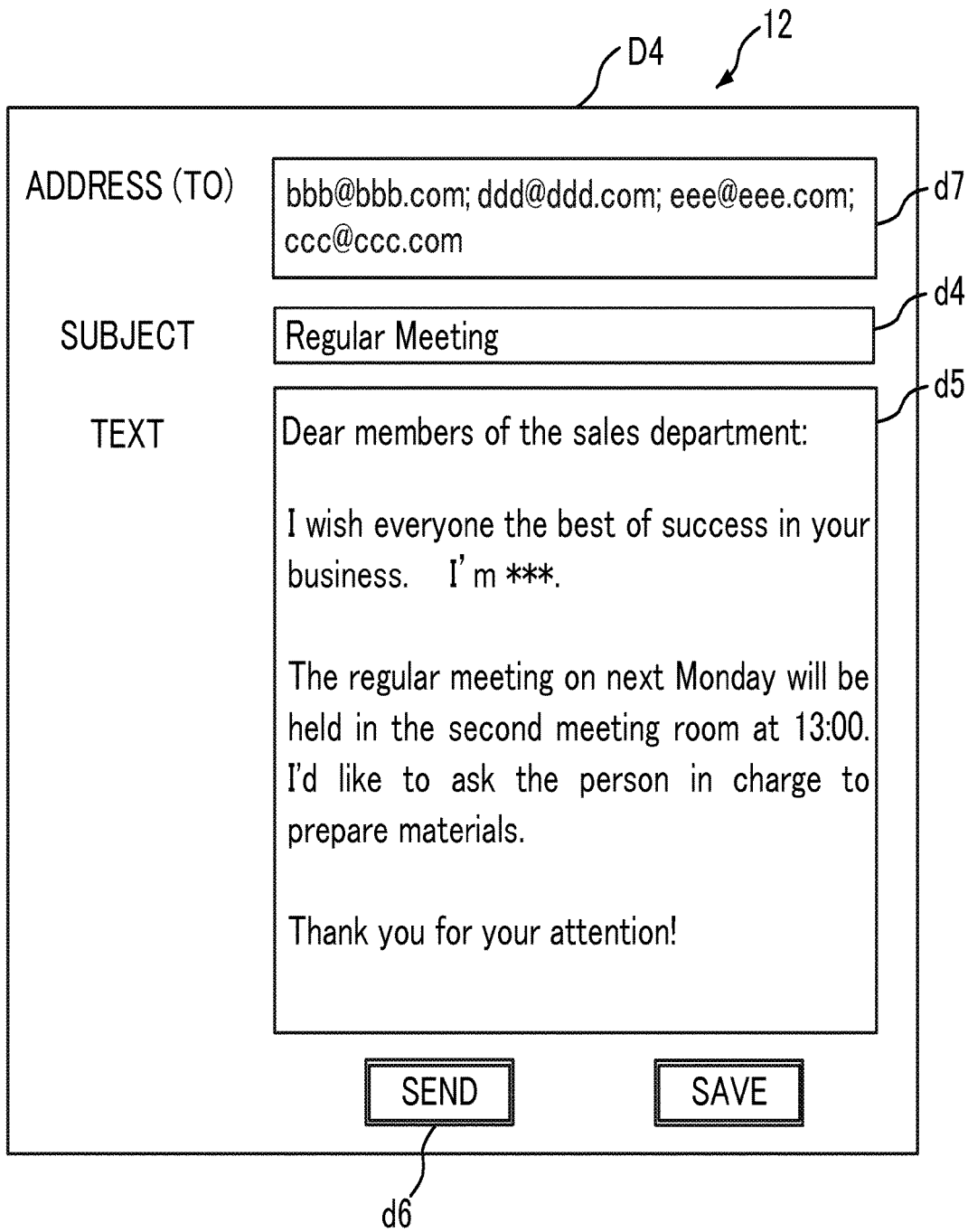

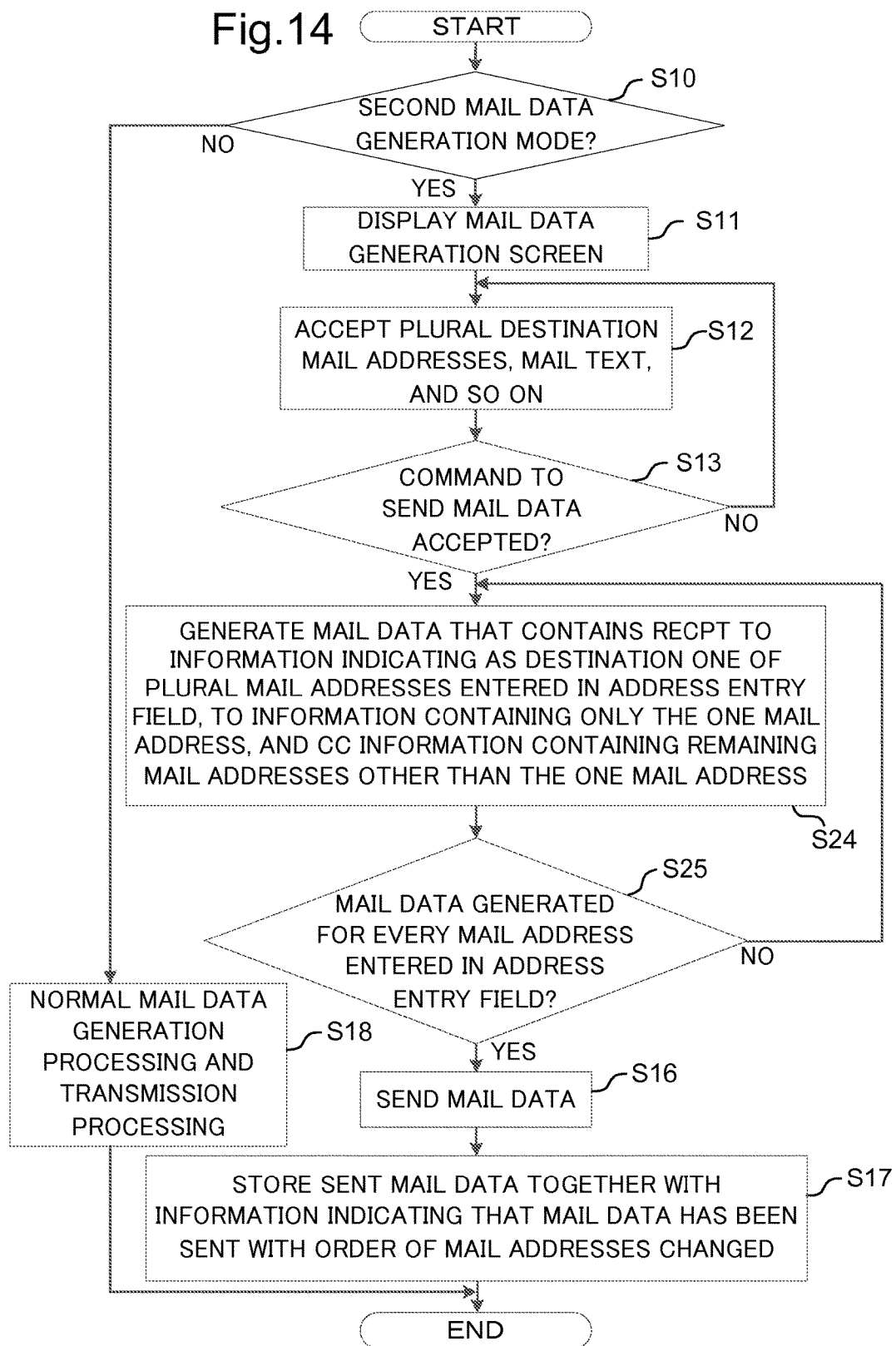

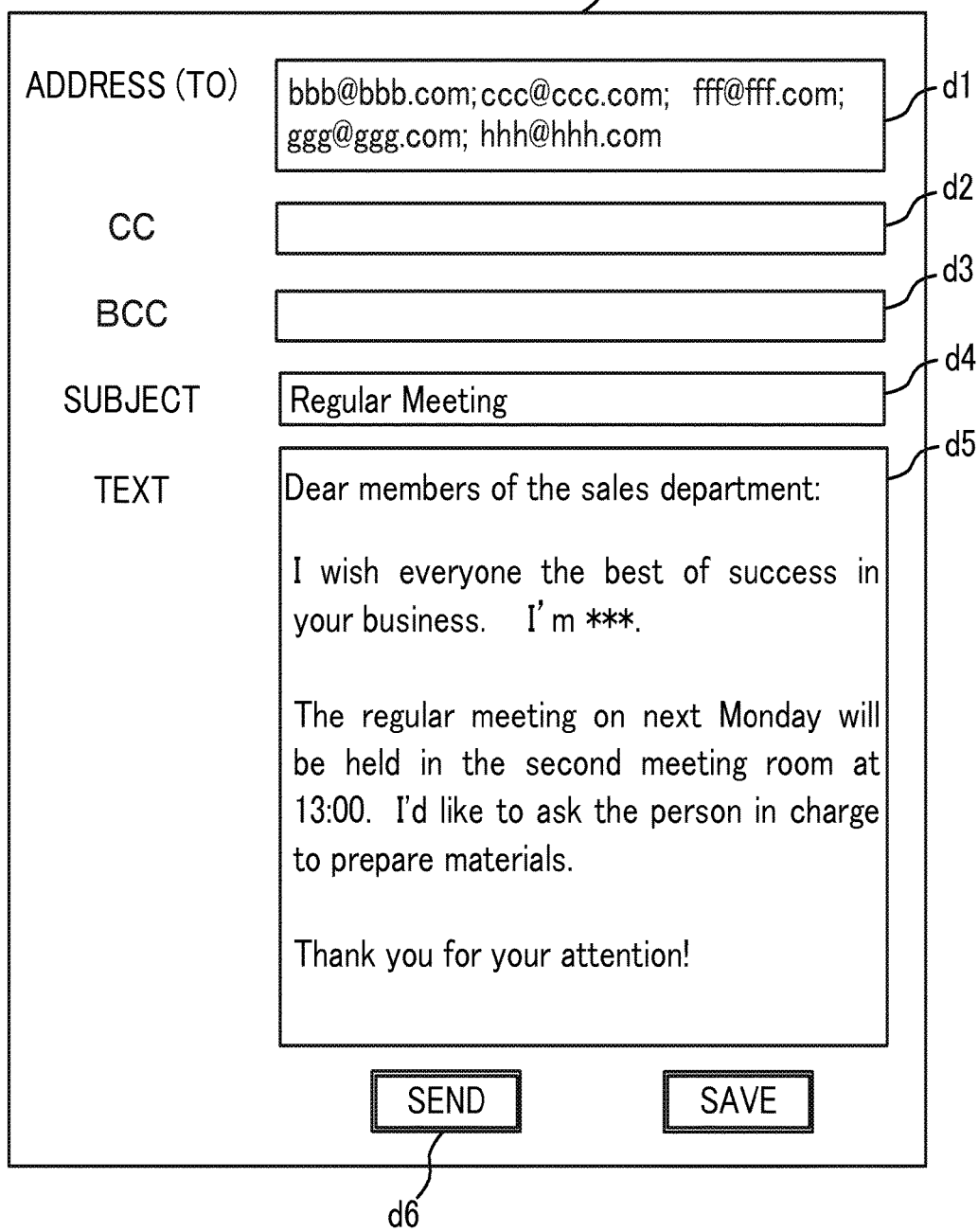

Fig.16B

| DISPLAY ORDER | MAIL ADDRESS |
|---|---|
| 1 | ccc@ccc.com |
| 2 | fff@fff.com |
| 3 | ggg@ggg.com |
| 4 | hhh@hhh.com |
| 5 | iii@iii.com |
| 6 | bbb@bbb.com |

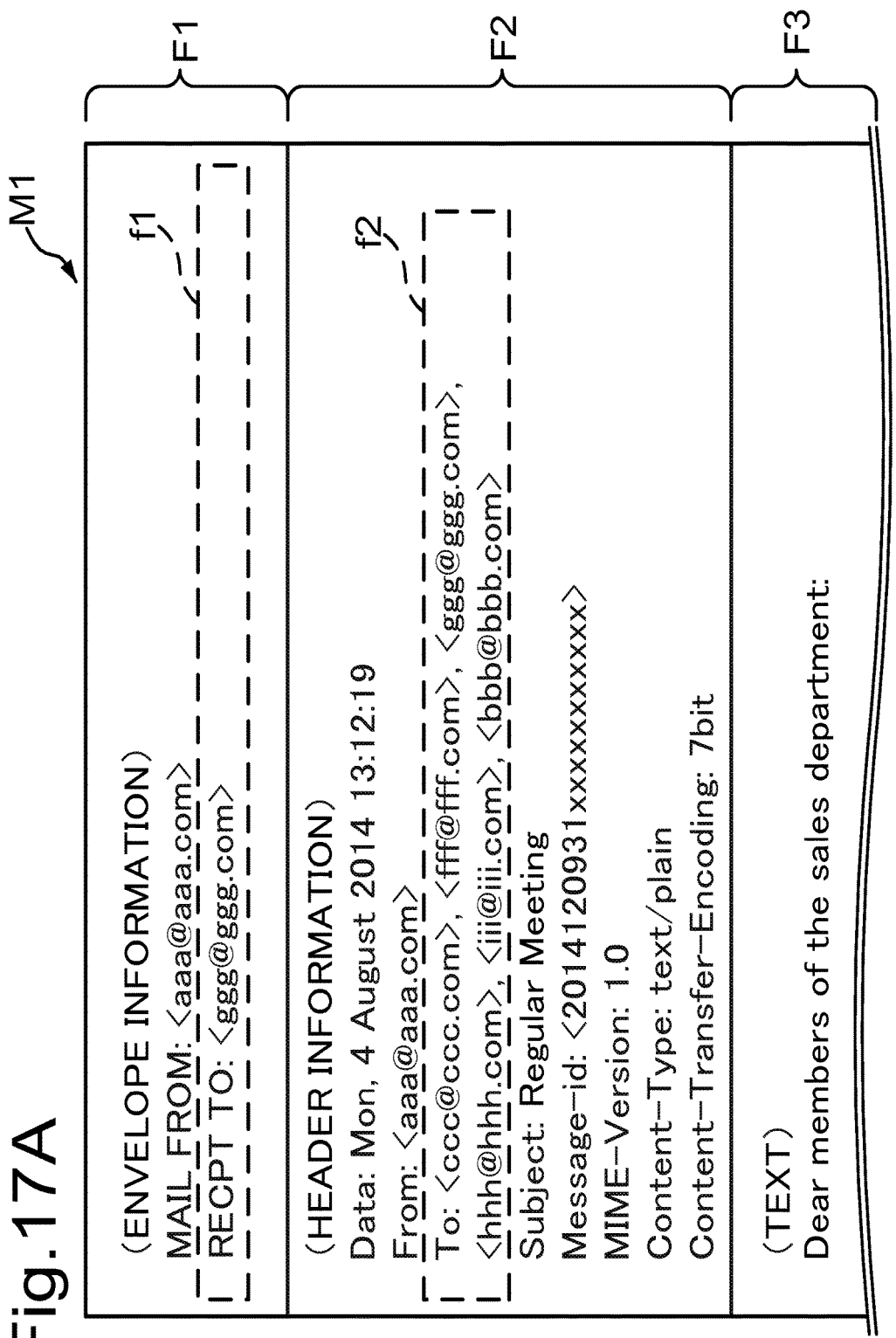

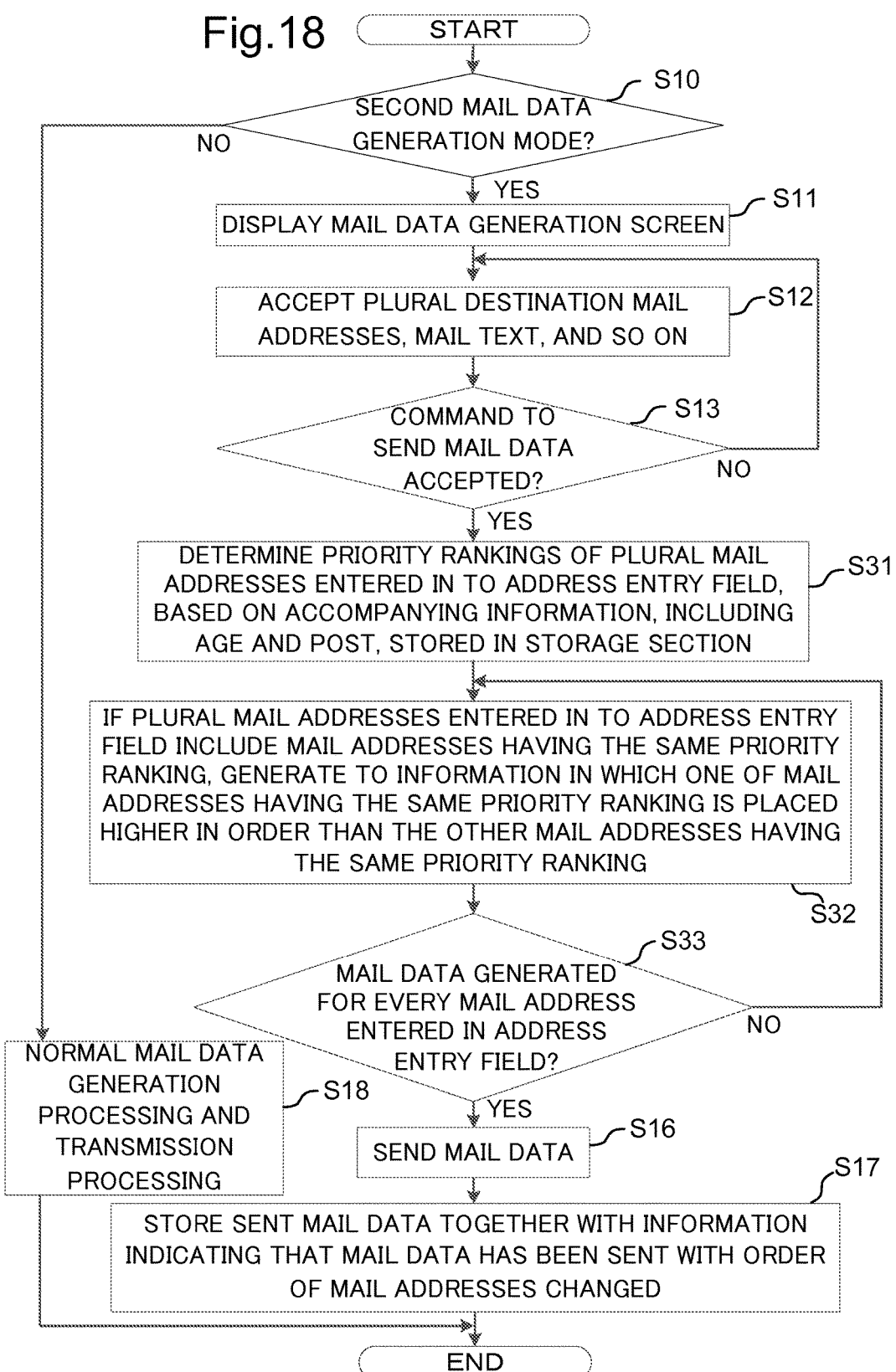

COMMUNICATION DEVICE AND COMPUTER-READABLE NON-TRANSITORY RECORDING MEDIUM WITH COMMUNICATION CONTROL PROGRAM RECORDED THEREON

INCORPORATION BY REFERENCE

This application claims priority to Japanese Patent Application No. 2014-174238 filed on Aug. 28, 2014, the entire disclosure of which are incorporated herein by reference.

BACKGROUND

The present disclosure relates to communication devices capable of transmitting mail data and computer-readable non-transitory recording media with a communication control program recorded thereon and particularly relates to a technique for changing the order of a list of destination addresses which will be displayed on the receiving side receiving the mail data.

In communication devices, such as a mail client, capable of generating mail data, a mail data generation screen containing a destination address entry field and a mail text entry field is presented to a user and mail data is generated based on information entered into the above fields on the mail data generation screen by the user. The mail data contains not only a mail text but also destination address list information showing an ordered list of destination addresses (mail addresses) to which the mail data is to be sent. In a receiving-side device having received the mail data, the list of mail addresses to which the mail data has been sent based on the destination address list information is displayed, together with the mail text, on a display.

In the general communication devices, destination address list information is generated which indicates a list of mail addresses arranged in the order in which the mail addresses have been entered in the destination address entry field. Therefore, the display of the receiving-side device also displays the list of mail addresses in the order in which the mail addresses have been entered in the destination address entry field. Unlike this, there is known a communication device A that can change the display order of a list of mail addresses to be displayed on a display of a receiving-side device, based on information on posts and so on attached to the mail addresses. In this communication device A, mail addresses accompanied by information on higher-ranking posts are changed to higher positions in the display order, whereas mail addresses accompanied by information on lower-ranking posts are changed to lower positions in the display order. Thus, the display order of the list of mail addresses displayed on the display of the receiving-side device can be aligned with the descending order of posts.

SUMMARY

A technique improved over the aforementioned technique is proposed as one aspect of the present disclosure.

A communication device according to an aspect of the present disclosure includes an acceptance section, a mail data generating section, and a transmission section. The acceptance section is configured to accept a plurality of destination addresses and a mail text to be sent to the plurality of destination addresses. The mail data generating section is configured to generate, for every one of the plurality of destination addresses, mail data that contains the mail text, destination information indicating the one of the plurality of destination addresses as a destination, and destination address list information which indicates a list of the plurality of destination addresses arranged in order and in which the one destination address is placed higher in order than when accepted by the acceptance section. The transmission section is configured to send the mail data generated by the mail data generating section.

A computer-readable non-transitory recording medium according to another aspect of the present disclosure contains a communication control program recorded thereon. The communication control program allows a computer to function as an acceptance section, a mail data generating section, and a transmission section. The acceptance section is configured to accept a plurality of destination addresses and a mail text to be sent to the plurality of destination addresses. The mail data generating section is configured to generate, for every one of the plurality of destination addresses, mail data that contains the mail text, destination information indicating the one of the plurality of destination addresses as a destination, and destination address list information which indicates a list of the plurality of destination addresses arranged in order and in which the one destination address is placed higher in order than when accepted by the acceptance section. The transmission section is configured to send the mail data generated by the mail data generating section.

BRIEF DESCRIPTION OF THE DRAWINGS

FIG. 5A shows an example of a mail data display screen displayed on a display of a mail client having received the mail data shown in FIG. 4.

FIG. 5B shows an example of a mail data display screen displayed on a display of a mail client having received mail data shown in FIG. 6A.

FIGS. 6A and 6B show examples of the content of mail data generated in a second mail data generation mode based on information entered through the mail data generation screen shown in FIG. 3.

FIG. 11A shows an example of the content of mail data generated in the second mail data generation mode based on information entered through the mail data generation screen shown in FIG. 9.

FIG. 11B shows an example of a mail data display screen displayed on a display of a mail client having received the mail data shown in FIG. 11A.

FIG. 12 shows an example of a mail data generation screen displayed on a display of a mail client according to Embodiment 2.

FIG. 14 is a flowchart showing a processing flow of mail data generation processing and transmission processing performed by the mail client according to Embodiment 2.

FIG. 16A shows an example of a mail data generation screen displayed on a display of the mail client according to Embodiment 3.

FIG. 16B is a table showing a display order of mail addresses determined based on the priority rankings shown in FIG. 15.

FIGS. 17A and 17B show examples of the content of mail data generated based on information entered through the mail data generation screen shown in FIG. 16A.

FIG. 18 is a flowchart showing a processing flow of mail data generation processing and transmission processing performed by the mail client according to Embodiment 3.

DETAILED DESCRIPTION

Hereinafter, a description will be given of a communication device and a communication control program, both according to one embodiment of the present disclosure, with reference to the drawings.

Embodiment 1

Figure 1:
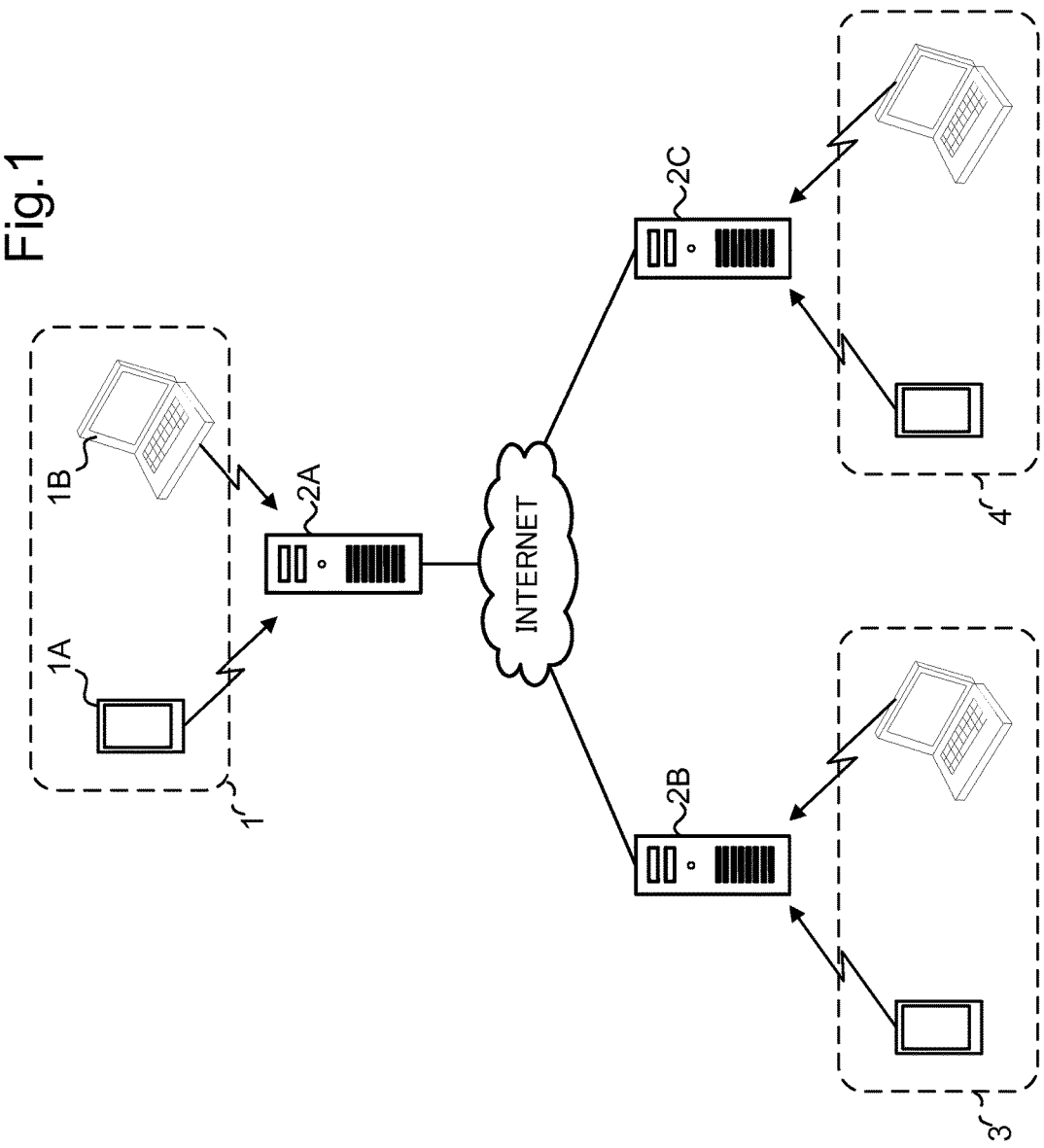
FIG. 1 is a conceptual diagram of a mail sending/receiving system according to Embodiment 1 of the present disclosure.

FIG. 1 is a conceptual diagram of a mail sending/receiving system according to Embodiment 1 of the present disclosure. The mail sending/receiving system can be constituted by a mail client (communication device) and a mail server which are connected via the Internet to each other.

A mail client 1A and a mail client 1B (hereinafter often referred to collectively as a "mail client 1") are a mobile terminal, such as a smartphone, and a PC (personal computer). The mail client 1 can establish data communication with a mail server 2A when attached to the Internet via a communication network of a cellular phone company, a public wireless LAN (local area network) or the like. The mail client 1 generates mail data according to a user's operation of a mail originator and sends the generated mail data to the mail server 2A using SMTP (Simple Mail Transfer Protocol).

The mail server 2A delivers mail data to other mail servers 2B or 2C based on the mail data sent from the mail client 1.

A mail client 3 and a mail client 4 communicate with the mail server 2B and the mail server 2C, respectively, and download (receive) the mail data if the mail data is delivered to the associated mail servers.

Figure 2:
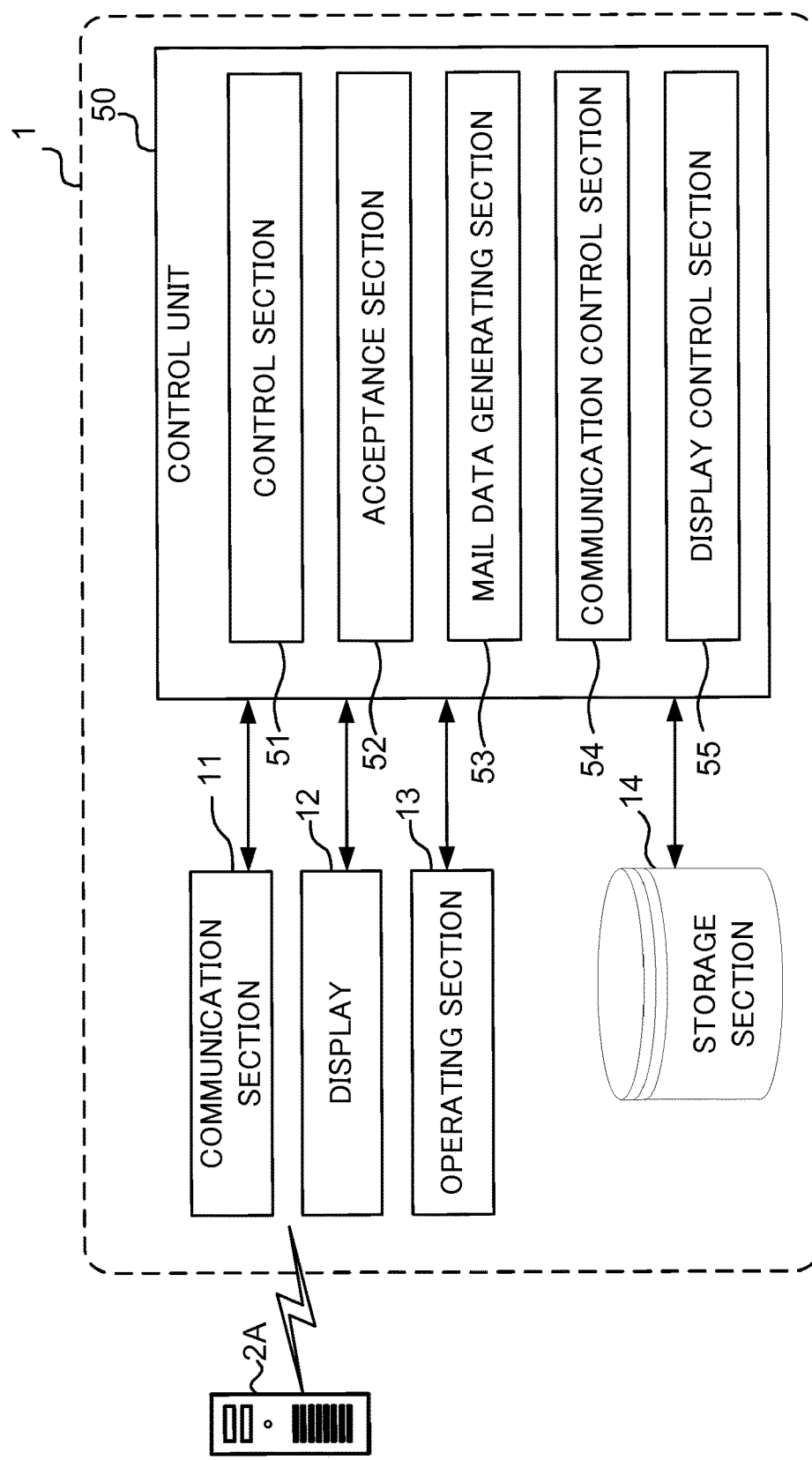
FIG. 2 is a block diagram showing the configuration of a mail client according to Embodiment 1 of the present disclosure.

FIG. 2 is a block diagram showing the configuration of the mail client 1. The mail client 1 includes a communication section 11, a display 12, an operating section 13, and a storage section 14.

The communication section 11 includes a communication module, such as a LAN chip, and is configured to send and receive data to and from the mail server 2A under the control of a communication control section 54 to be described hereinafter.

The display 12 is formed by including a liquid crystal display (LCD) or an organic light-emitting diode (OLED) display. The display 12 is configured to display a mail data generation screen, a mail data display screen, and other screens under the control of a display control section 55 to be described hereinafter.

The operating section 13 is formed by including an input device, such as a keyboard, and a pointing device, such as a mouse. The operating section 13 is configured to accept from a mail originator user's operations associated with the screen displayed on the display 12.

The storage section 14 is a large storage device, such as an HDD (hard disk drive).

The mail client 1 further includes a control unit 50. The control unit 50 is composed of a CPU (central processing unit), a RAM (random access memory), a ROM (read only memory), and so on. When a program, such as a communication control program, stored in the above ROM or the storage section 14 is executed by the above CPU, the control unit 50 functions as a control section 51, an acceptance section 52, a mail data generating section 53, a communication control section 54, and a display control section 55. Alternatively, each of the control section 51, the acceptance section 52, the mail data generating section 53, the communication control section 54, and the display control section 55 of the control unit 50 may not be implemented by the operation of the control unit 50 in accordance with the above program but may be constituted by a hardware circuit.

The control section 51 governs the overall operation control of the mail client 1. The control section 51 is connected to the communication section 11, the display 12, the operating section 13, the storage section 14, and so on and performs the operation control of the above components connected thereto and signal or data transfer to and from the components.

The acceptance section 52 has the function of accepting, based on a user's operation of a mail originator through the operating section 13, various commands, such as a command to respond to the mail data received by the communication section 11, a command to enter a mail text, a command to enter a destination mail address, and a command to select the type of destination address.

The mail data generating section 53 has the function of generating mail data based on the command accepted by the acceptance section 52.

Figure 3:
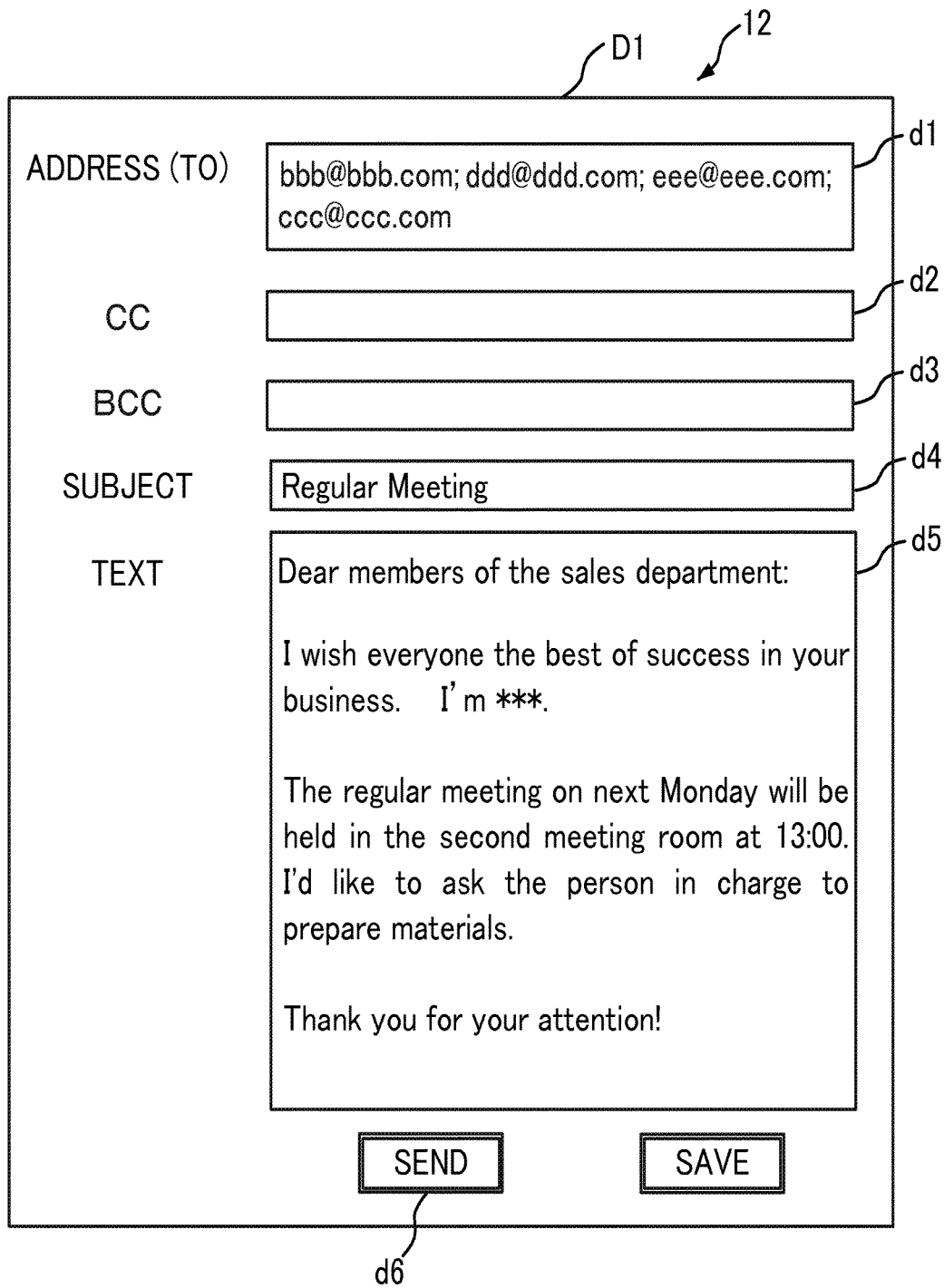
FIG. 3 shows an example of a mail data generation screen displayed on a display of the mail client according to Embodiment 1 of the present disclosure.

FIG. 3 shows an example of a mail data generation screen D1 displayed on the display 12. The mail data generation screen D1 is provided with a TO address entry field d1 for accepting a command to enter a TO address, a CC address entry field d2 for accepting a command to enter a CC (carbon copy) address, a BCC address entry field d3 for accepting a command to enter a BCC (blind carbon copy) address, a subject entry field d4 for accepting a command to enter a subject, and a mail text entry field d5 for accepting a command to enter a mail text. Furthermore, the mail data generation screen D1 is also provided with a send button d6. When the acceptance section 52 accepts the selection of the send button d6, the mail data generating section 53 generates mail data according to the respective items of information entered in the above entry fields.

The mail client 1 has the following two operating modes relating to processing for generating mail data: a first mail data generation mode and a second mail data generation mode. The first mail data generation mode is an operating mode for generating, like general mail clients, mail data containing To information (destination address list information) indicating a list of destination mail addresses arranged in order of entry into the TO address entry field d1. On the other hand, the second mail data generation mode is an operating mode, without generating To information indicating a list of destination mail addresses arranged in order of entry into the TO address entry field d1, for generating To information indicating a list of destination mail addresses arranged in an order changed from the order of entry into the TO address entry field d1 and generating mail data containing the generated To information.

Figure 4:
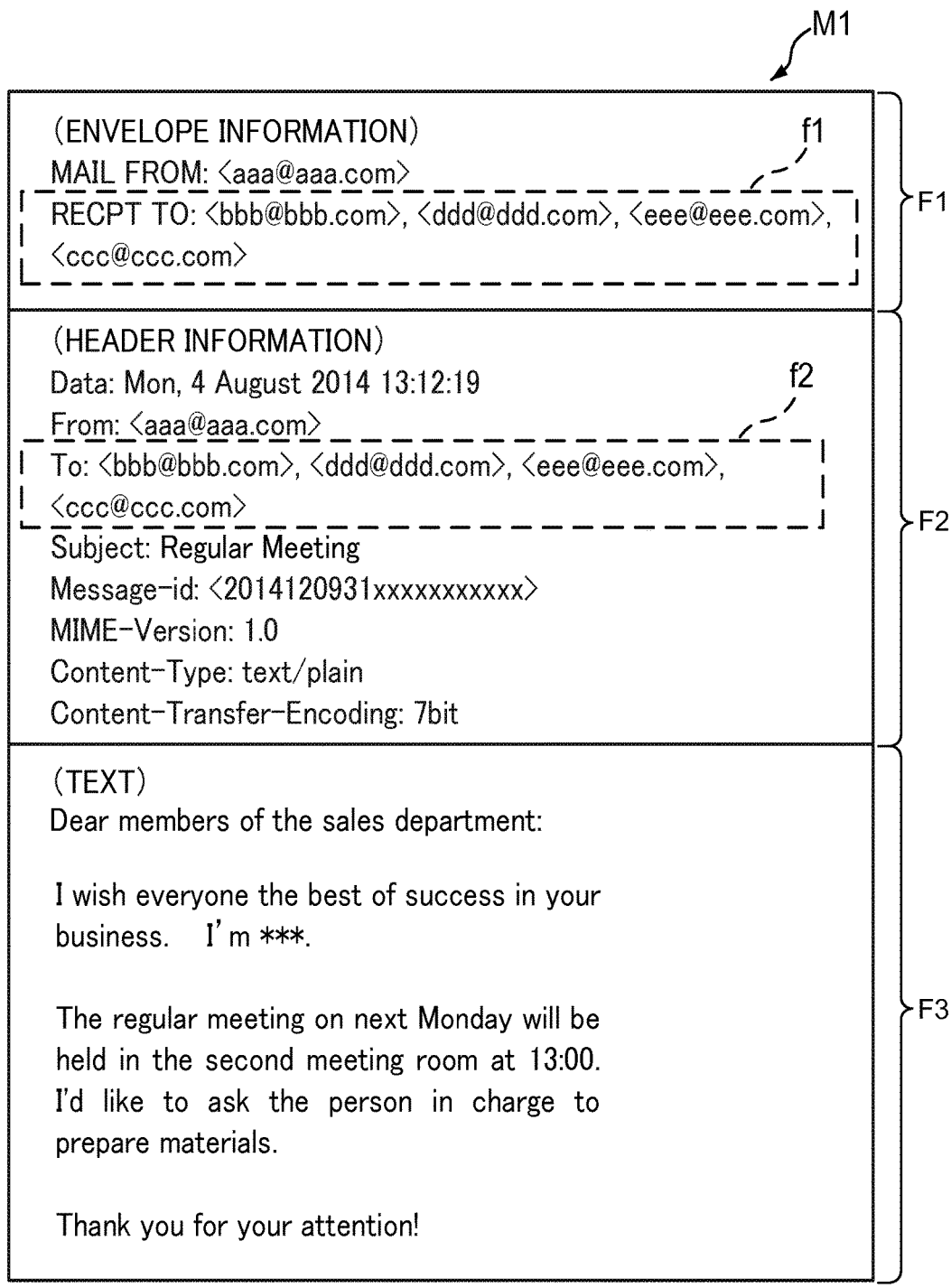
FIG. 4 shows an example of the content of mail data generated in a first mail data generation mode based on information entered through the mail data generation screen shown in FIG. 3.

First, a description will be given of the first mail data generation mode. FIG. 4 shows an example of the content of mail data M1 generated in the first mail data generation mode based on information entered through the mail data generation screen D1 shown in FIG. 3. The mail data M1 is composed of envelope information F1, header information F2, and mail text information F3. The envelope information F1 contains MAIL FROM information indicating a mail address of the source of the mail data and RECPT TO information (destination information) indicating respective mail addresses of one or more destinations of the mail data. The mail data generating section 53 generates envelope information F1 containing as the MAIL FROM information a mail address of an mail originator and containing as the RECPT TO information all of mail addresses entered in the TO address entry field d1, the CC address entry field d2, and the BCC address entry field d3 (see within the dotted line area f1 in FIG. 4). The generated envelope information F1 is used when the mail server 2A identifies mail servers for delivery.

The header information F2 contains Data information indicating the date and time of transmission of the mail data, From information indicating the mail address of the source of the mail data, To information indicating a list of mail addresses of TO destinations, CC information indicating a list of mail addresses of CC destinations, Subject information indicating a subject, Message-id information as a unique identifier for each mail data, and so on. The mail data generating section 53 generates header information F2 containing as the To information a list of mail addresses entered in the TO address entry field d1, containing as the CC information a list of mail addresses entered in the CC address entry field d2, and containing as the Subject information the content entered in the subject entry field d4. Particularly in the first mail data generation mode, the mail data generating section 53 generates To information indicating a list of mail addresses arranged in order of entry into the TO address entry field d1 (see within the dotted line area f2 in FIG. 4). Furthermore, the mail data generating section 53 keeps mail addresses entered in the BCC address entry field d3 out of the header information F2.

The generated header information F2 is analyzed by the mail client 1, the mail client 3, the mail client 4 or the like having received the mail data M1. The mail client having received the mail data M1 determines, based on the analysis result, the content of a display screen to be displayed on the display. FIG. 5A shows an example of a mail data display screen D2 displayed on the display of the mail client having received the mail data M1 shown in FIG. 4. The mail data display screen D2 is provided with a sender display field d11, a TO address display field d12, a CC address display field d13, a subject display field d14, and a mail text display field d15. The mail client having received the mail data M1 allows the display to display the mail address indicated by the From information of the header information F2 in the sender display field d11, display the list of mail addresses indicated by the To information of the header information F2 in the TO address display field d12, display the list of mail addresses indicated by the CC information of the header information F2 in the CC address display field d13, display the content indicated by the Subject information of the header information F2 in the subject display field d14, and display the content indicated by the mail text information F3 in the mail text display field d15. Particularly, the mail client having received the mail data M1 displays the list of mail addresses in the TO address display field d12 in the order in which the To information contained in the mail data M1 indicates the mail addresses. In other words, the list of mail addresses displayed in the TO address display field d12 of the display of the mail client having received the mail data M1 is presented in order of entry into the TO address entry field d1 in the first mail data generation mode.

Next, a description will be given of the second mail data generation mode. In the second mail data generation mode, the mail data generating section 53 generates, for every one of a plurality of mail addresses entered in the TO address entry field d1, mail data that contains RECPT TO information indicating the one of the plurality of mail addresses as a destination and To information indicating a list of the plurality of mail addresses with the one mail address placed at the top of the list. As a result, for each of the plurality of mail addresses entered in the TO address entry field d1, mail data having different envelope information F1 and different header information F2 (but having common mail text information F3) is generated.

Figure 6B:
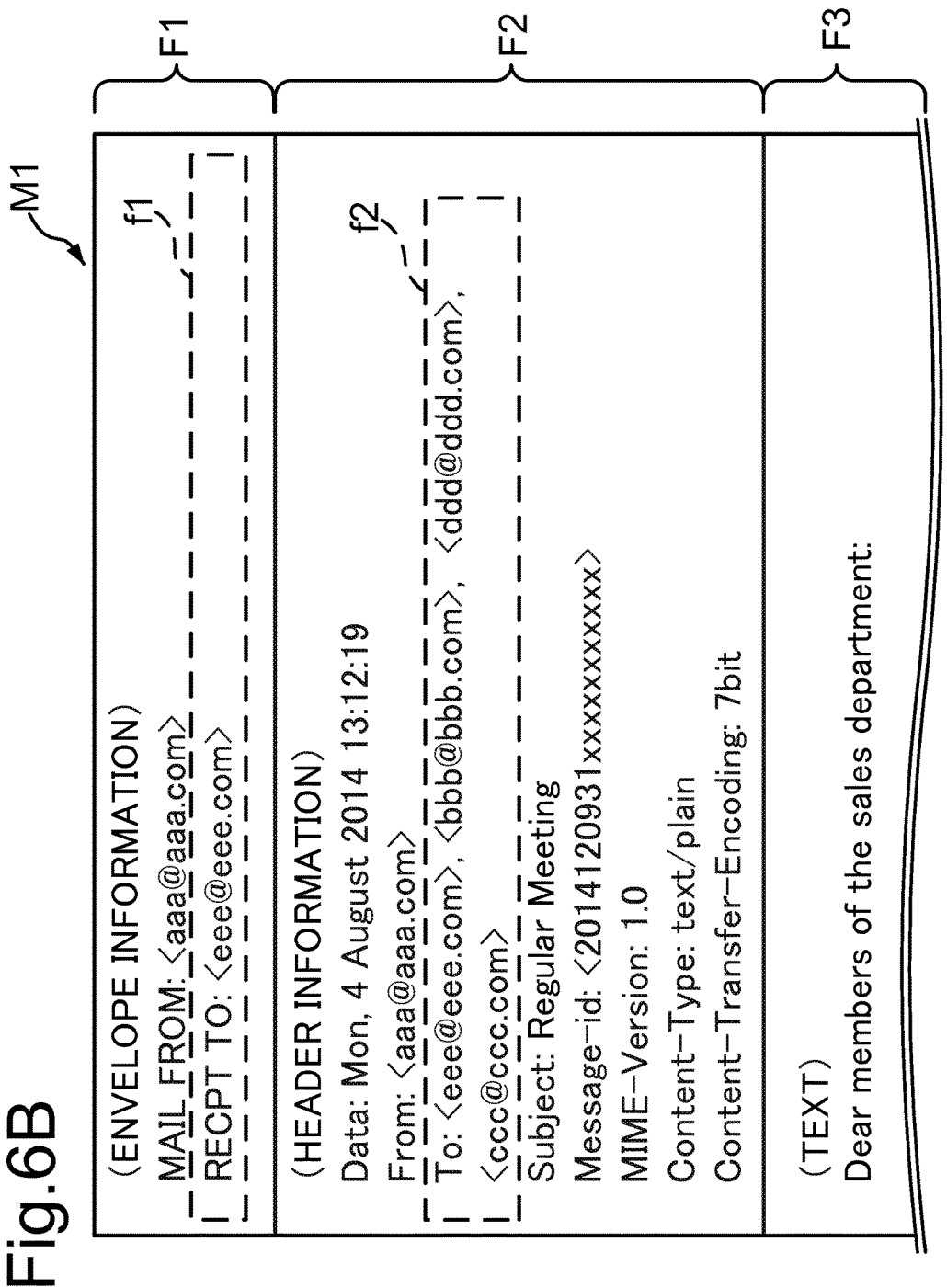

FIGS. 6A and 6B show examples of the content of mail data M1 generated in the second mail data generation mode based on information entered through the mail data generation screen D1 shown in FIG. 3. The mail data M1 shown in FIG. 6A is mail data the destination of which is a mail address "ddd@ddd.com" and the RECPT TO information of which contains only the mail address "ddd@ddd.com" (see within the dotted line area f1 in FIG. 6A). Furthermore, the To information of the mail data M1 contains a list of mail addresses the order of which has been changed from the order of entry into the TO address entry field d1 to the order in which the mail address "ddd@ddd.com" is placed at the top of the list (see within the dotted line area f2 in FIG. 6B).

The mail data M1 shown in FIG. 6A is received by a mail client corresponding to the mail address "ddd@ddd.com". The display of the mail client having received the mail data M1 displays the mail data display screen D2 shown in FIG. 5B. Specifically, displayed in the TO address display field d12 on the display of the mail client is not the list of mail addresses arranged in order of entry into the TO address entry field d1 but the list of mail addresses arranged in the order in which the mail address "ddd@ddd.com" of itself (the mail client having received the mail data M1) is placed at the top of the list.

On the other hand, the mail data M1 shown in FIG. 6B is mail data the destination of which is a mail address "eee@eee.com", the RECPT TO information thereof contains only the mail address "eee@eee.com", and the To information thereof contains a list of mail addresses the order of which has been changed from the order of entry into the TO address entry field d1 to the order in which the mail address "eee@eee.com" is placed at the top of the list.

Although the mail data shown in FIG. 6A is a set of mail data the destination of which is the mail address "ddd@ddd.com" and the mail data shown in FIG. 6B is a set of mail data the destination of which is the mail address "eee@eee.com", the mail data generating section 53 generates, in addition to the above two sets of mail data, other two sets of mail data to be delivered to mail addresses "bbb@bbb.com" and "ccc@ccc.com" which are the other mail addresses entered in the TO address entry field d1 shown in FIG. 3.

In a mail client having received the mail data M1, the order of the list of mail addresses displayed in the TO address display field d12 may have an influence on the degree of user's interest in the received mail data M1. For example, the user is very likely to take a great interest in the mail data M1 in which his/her own mail address is placed at the top of the list in the TO address display field d12. In contrast, the user may take less interest in the mail data M1 in which his/her own mail address is placed lower on the list of mail addresses displayed in the TO address display field d12.

When mail data is generated on a general mail client, a list of mail addresses in the TO address display field on a receiving-side mail client is displayed in order of entry of the mail addresses into the destination address entry field on the sending-side mail client. Therefore, if it is desired that users of all of destination mail addresses take a great interest in the mail data, it is necessary to generate different sets of mail data individually for every mail address, which is cumbersome.

Furthermore, the previously-described communication device A is configured to change the display order of the list of mail addresses to be displayed on the display of a receiving-side device, based on information on posts and so on attached to the mail addresses. Therefore, like the above general communication device, the communication device A cannot respond to a request from a mail originator to make users of all of the destination mail addresses highly interested in the mail data.

Unlike the above known communication devices, in the mail client 1 according to this embodiment, the mail data generating section 53 can generate, for every one of a plurality of mail addresses entered in the TO address entry field d1, mail data that contains RECPT TO information indicating the one of the plurality of mail addresses as a destination and To information indicating a list of the plurality of mail addresses with the one mail address placed at the top of the list. Thus, each of receiving-side mail clients can display in the TO address display field d12 a list of mail addresses in which the mail address of its own is placed at the top of the list. As a result, it is possible to make the users of all of the destination mail addresses highly interested in the mail data.

The communication control section 54 controls the data communication operation of the communication section 11 to function as a transmission section configured to send mail data and a receiving section configured to receive mail data. Specifically, the communication control section 54 sends the mail data generated by the mail data generating section 53 via the communication section 11 to the mail server 2A. Furthermore, the communication control section 54 communicates, with the timing with which the acceptance section 52 accepts a command to acknowledge receipt of a mail or the timing of passage of a predetermined period of time, with the mail server 2A via the communication section 11 to confirm whether or not the mail data has been delivered to the mail server 2A. If the mail data has been delivered, the communication control section 54 downloads the mail data via the communication section 11 from the mail server 2A.

Figure 7:
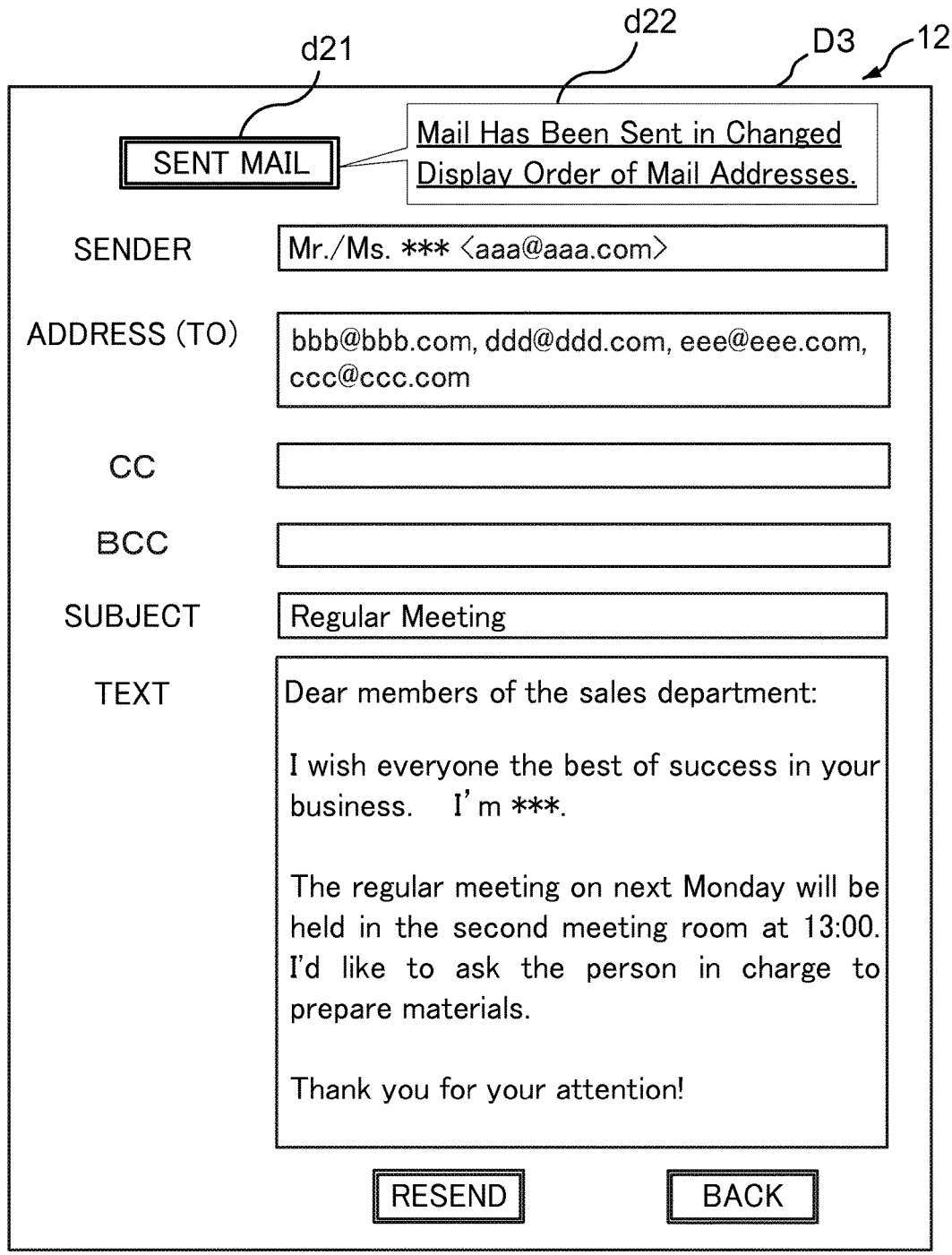
FIG. 7 shows an example of a sent mail data display screen displayed on the display of the mail client according to Embodiment 1 of the present disclosure.

The display control section 55 has the function of controlling the operation of the display 12 for displaying an image. For example, the display control section 55 allows the display 12 to display the above mail data generation screen D1 or the above mail data display screen D2. Furthermore, the display control section 55 allows the display 12 to display a sent mail data display screen D3 shown in FIG. 7. The sent mail data display screen D3 contains, together with information on the list of destination mail addresses and the mail text of the mail data sent by the communication control section 54, information d21 indicating that the mail data has already been sent and information d22 indicating that the mail data has been sent with the display order of the mail addresses changed. Thus, when the mail data generating section 53 generates To information indicating a list of mail addresses arranged in an order changed from the order of entry into the TO address entry field d1 and the communication control section 54 sends mail data containing the generated To information, the user can be informed of the fact that the mail data has been sent with the display order of the mail addresses changed.

Figure 8:
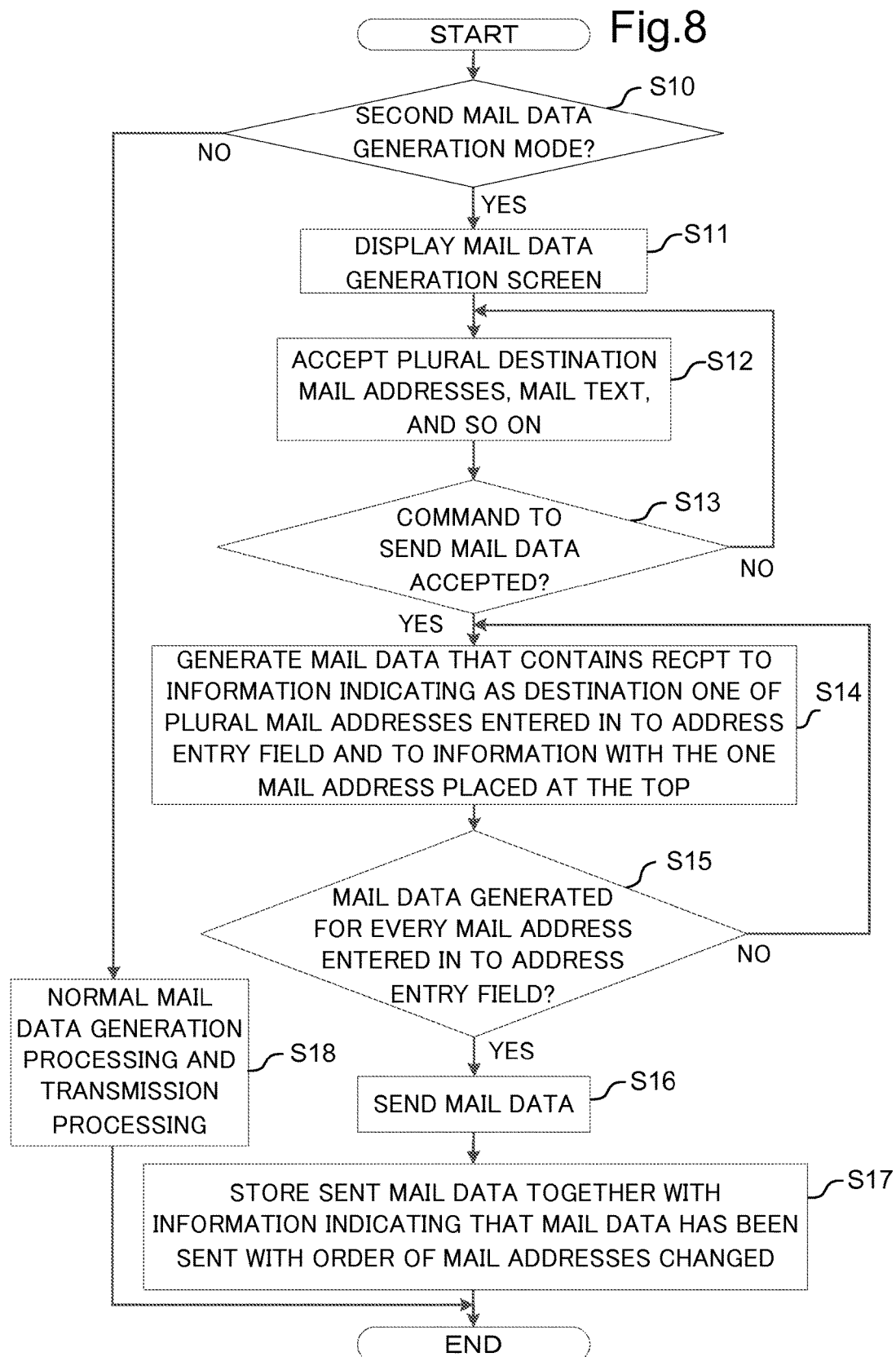
FIG. 8 is a flowchart showing a processing flow of mail data generation processing and transmission processing performed by the mail client according to Embodiment 1 of the present disclosure.

Next, a description will be given of a processing flow of the mail client 1 having the above configuration. FIG. 8 is a flowchart showing a processing flow of mail data generation processing and transmission processing performed by the mail client 1. The control section 51 of the mail client 1 determines whether or not the operating mode of the mail client 1 is the second mail data generation mode (step S10). When the acceptance section 52 accepts a command to transition to the second mail data generation mode based on a user's operation using the operating section 13 or the like, the control section 51 switches the operating mode of the mail client 1 to the second mail data generation mode.

If the operating mode is not the second mail data generation mode but the first mail data generation mode (NO in step S10), the mail data generating section 53 and the communication control section 54 perform normal mail data generation processing and normal transmission processing (step S18). These kinds of processing are the same as those in a general mail client and, therefore, the description thereof will be omitted.

If the operating mode is the second mail data generation mode (YES in step S10), the display control section 55 allows the display 12 to display the mail data generation screen D1 (step S11).

Then, when the acceptance section 52 accepts a plurality of destination mail addresses, a mail text, and so on (step S12) and thereafter accepts a command to send mail data (YES in step S13), the mail data generating section 53 generates mail data that contains RECPT TO information indicating as a destination one of the plurality of mail addresses entered in the TO address entry field d1 and To information indicating a list of the plurality of mail addresses with the one mail address placed at the top of the list (step S14).

The mail data generating section 53 performs the mail data generation processing of step S14 for all the mail addresses entered in the TO address entry field d1 (step S15).

If mail data has been generated for all of the mail addresses entered in the TO address entry field d1 (YES in step S15), the communication control section 54 sends the plurality of sets of mail data generated by the mail data generating section 53 via the communication section 11 to the mail server 2A (step S16).

After the sending of the mail data, the control section 51 allows the storage section 14 to store the mail data sent in the processing of step S16, together with information indicating that the mail data has been sent with the order of the mail addresses changed (step S17). The information stored in the storage section 14 is read on the occasion that the display control section 55 allows the display 12 to display the sent mail data display screen D3.

<Supplement 1>

Although in the above Embodiment 1 the description has been given of the case where the mail data generating section 53 generates the To information in which one of a plurality of mail addresses entered in the TO address entry field d1 is placed at the top of the list, the present disclosure is not necessarily limited to this case. The mail data generating section 53 may not generate the To information in which the one mail address is placed at the top of the list but may generate To information in which the one mail address is placed higher on the list than when accepted by the acceptance section 52. Thus, the mail address of each receiving-side mail client displayed in the TO address display field d12 of its own can be placed higher on the list than in the case where the mail data is generated on a general mail client. As a result, it is possible to make the users of all of the destination mail addresses highly interested in the mail data.

<Supplement 2>

Although in the above Embodiment 1 the description has been given of the case where the mail data generating section 53 generates, for every one of a plurality of mail addresses entered in the TO address entry field d1, mail data that contains RECPT TO information indicating the one of the plurality of mail addresses as a destination and To information indicating a list of the plurality of mail addresses with the one mail address placed at the top of the list, the present disclosure is not necessarily limited to this case. The mail data generating section 53 may generate, for every one of a plurality of mail addresses entered in the CC address entry field d2, mail data that contains RECPT TO information indicating the one of the plurality of mail addresses as a destination and CC information (CC address list information) indicating a list of the plurality of mail addresses with the one mail address placed at the top of the list.

Figure 9:
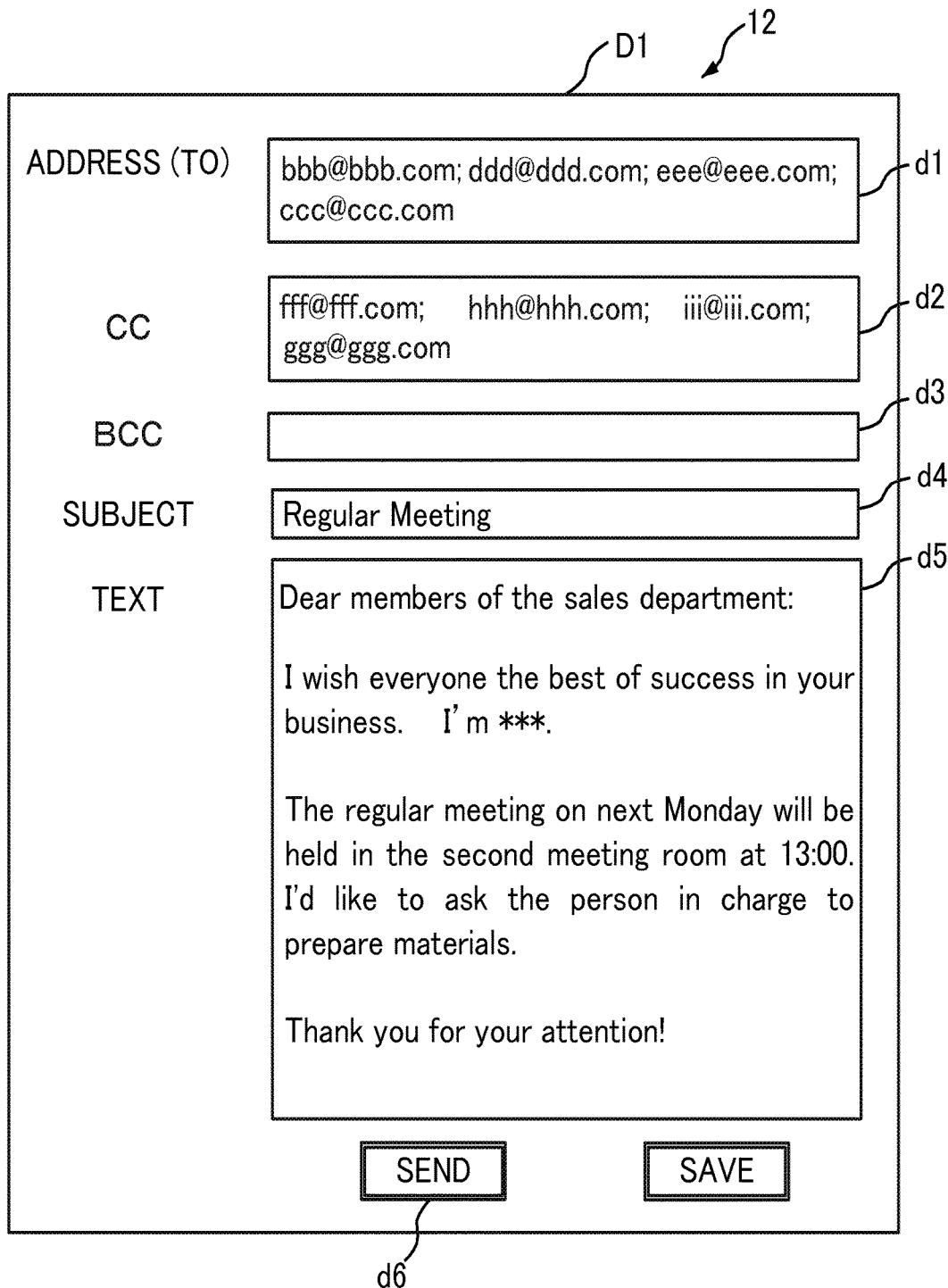
FIG. 9 shows an example of a mail data generation screen displayed on a display of a mail client according to Supplement 2.
Figure 10:
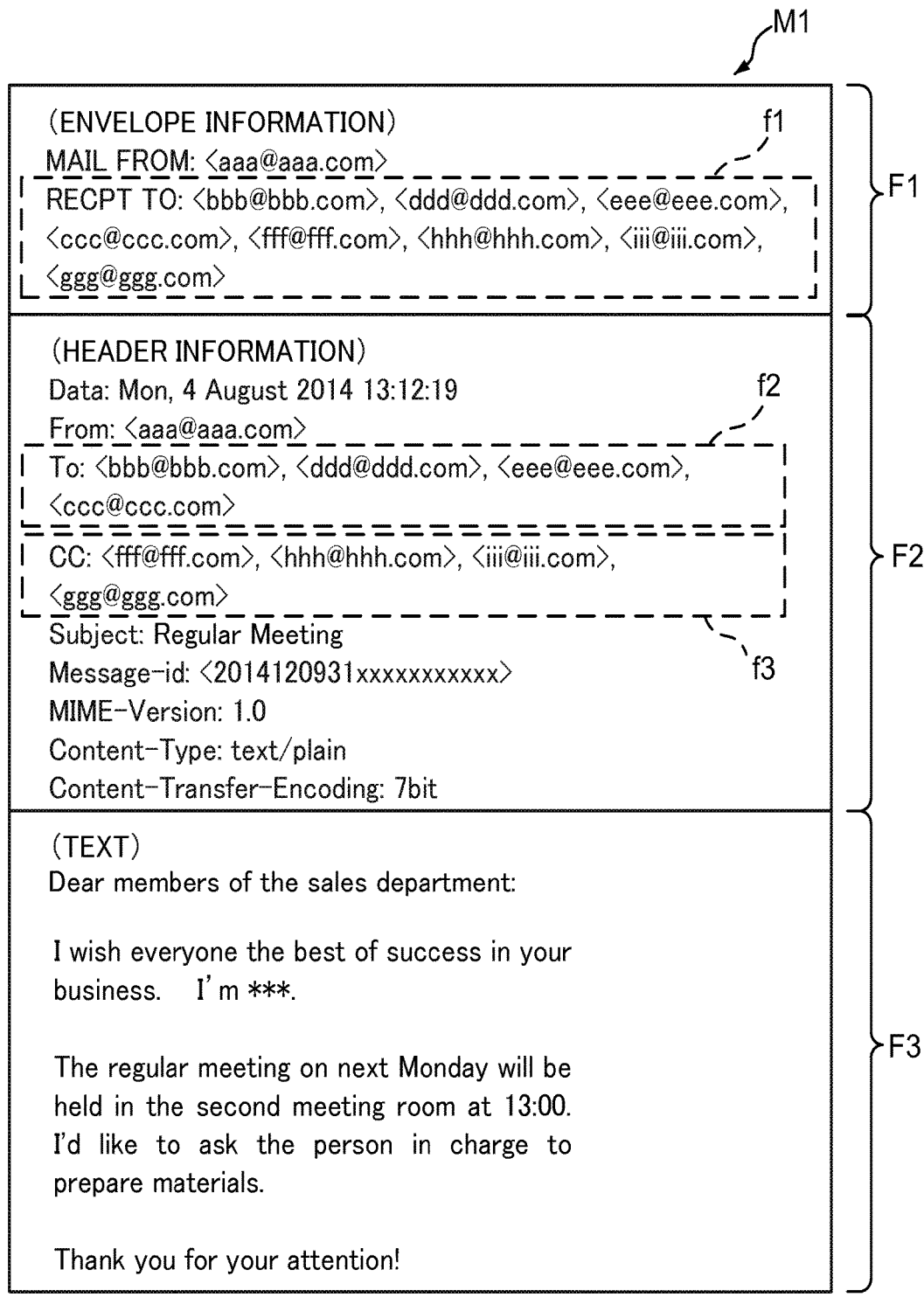
FIG. 10 shows an example of the content of mail data generated in the first mail data generation mode based on information entered through the mail data generation screen shown in FIG. 9.

FIG. 9 shows an example of the mail data generation screen D1 displayed on the display 12 of the mail client 1 according to Supplement 2. FIG. 10 shows an example of the content of mail data M1 generated in the first mail data generation mode based on information entered through the mail data generation screen D1 shown in FIG. 9. In the first mail data generation mode, the mail data generating section 53 generates CC information indicating a list of mail addresses arranged in order of entry into the CC address entry field d2 (see within the dotted line area f3 in FIG. 10).

FIG. 11A shows an example of the content of mail data M1 generated in the second mail data generation mode based on information entered through the mail data generation screen D1 shown in FIG. 9. In the second mail data generation mode, the mail data generating section 53 does not generate CC information indicating a list of a plurality of mail addresses arranged in order of entry into the CC address entry field d2 but generates mail data containing CC information which indicates a list of the plurality of mail addresses entered in the CC address entry field d2 and in which one of the plurality of mail addresses is placed at the top of the list. The mail data M1 shown in FIG. 11A is mail data the destination of which is a mail address "hhh@hhh.com" and the RECPT TO information of which contains only the mail address "hhh@hhh.com" (see within the dotted line area f1 in FIG. 11A). Furthermore, the To information of the mail data M1 contains a list of mail addresses arranged in order of entry into the TO address entry field d1 (see within the dotted line area f2 in FIG. 11A). Moreover, the CC information of the mail data M1 contains a list of the mail addresses the order of which has been changed from the order of entry into the CC address entry field d2 to the order in which the mail address "hhh@hhh.com" is placed at the top of the list (see within the dotted line area f3 in FIG. 11A).

The mail data M1 shown in FIG. 11A is received by a mail client corresponding to the mail address "hhh@hhh.com". The display of the mail client having received the mail data M1 displays the mail data display screen D2 shown in FIG. 11B. Specifically, displayed in the CC address display field d13 on the display of the mail client is not the list of mail addresses arranged in order of entry into the CC address entry field d2 but the list of mail addresses arranged in the order in which the mail address "hhh@hhh.com" of itself (the mail client having received the mail data M1) is placed at the top of the list.

As thus far described, in the mail client 1 according to Supplement 2, the acceptance section 52 accepts the specification of the types to which a plurality of destination mail addresses belong, including a type of TO address and a type of CC address. Then, the mail data generating section 53 generates, for one of mail addresses which belong to the type of TO address, mail data that contains RECPT TO information indicating the one of the mail addresses as a destination and To information indicating a list of the mail addresses with the one mail address placed at the top of the list. Furthermore, the mail data generating section 53 generates, for one of mail addresses which belong to the type of CC address, mail data that contains RECPT TO information indicating the one of the mail addresses as a destination and CC information indicating a list of the mail addresses with the one mail address placed at the top of the list. Also in this case, the same effects as those described in the above Embodiment 1 can be obtained.

Embodiment 2

In the mail client 1 according to Embodiment 1, the acceptance section 52 accepts the specification of the types to which a plurality of destination mail addresses belong, including a type of TO address and a type of CC address, and the mail data generating section 53 changes the order of mail addresses among a plurality of mail addresses of the same type. Unlike this, in the mail client 1 according to Embodiment 2, the mail data generating section 53 does not change the order of mail addresses among a plurality of mail addresses of the same type but changes the order of mail addresses across a plurality of mail addresses of different types.

FIG. 12 shows an example of a mail data generation screen D4 displayed on the display 12 of the mail client 1 according to Embodiment 2. Unlike the mail data generation screen D1, the mail data generation screen D4 is not provided with the TO address entry field d1, the CC address entry field d2, and the BCC address entry field d3 (see FIG. 3). Instead, the mail data generation screen D4 is provided with an address entry field d7 for accepting any destination mail address. Specifically, the acceptance section 52 does not accept the specification of the types to which mail addresses belong, including a type of TO address, a type of CC address, and a type of BCC address, but accepts a plurality of mail addresses entered as destination mail addresses in the address entry field d7.

The mail data generating section 53 generates, for every one of a plurality of mail addresses entered in the address entry field d7, mail data that contains: RECPT TO information indicating the one of the plurality of mail addresses as a destination; To information containing only the one mail address; and CC information containing the remaining mail addresses other than the one mail address.

Figure 13A:
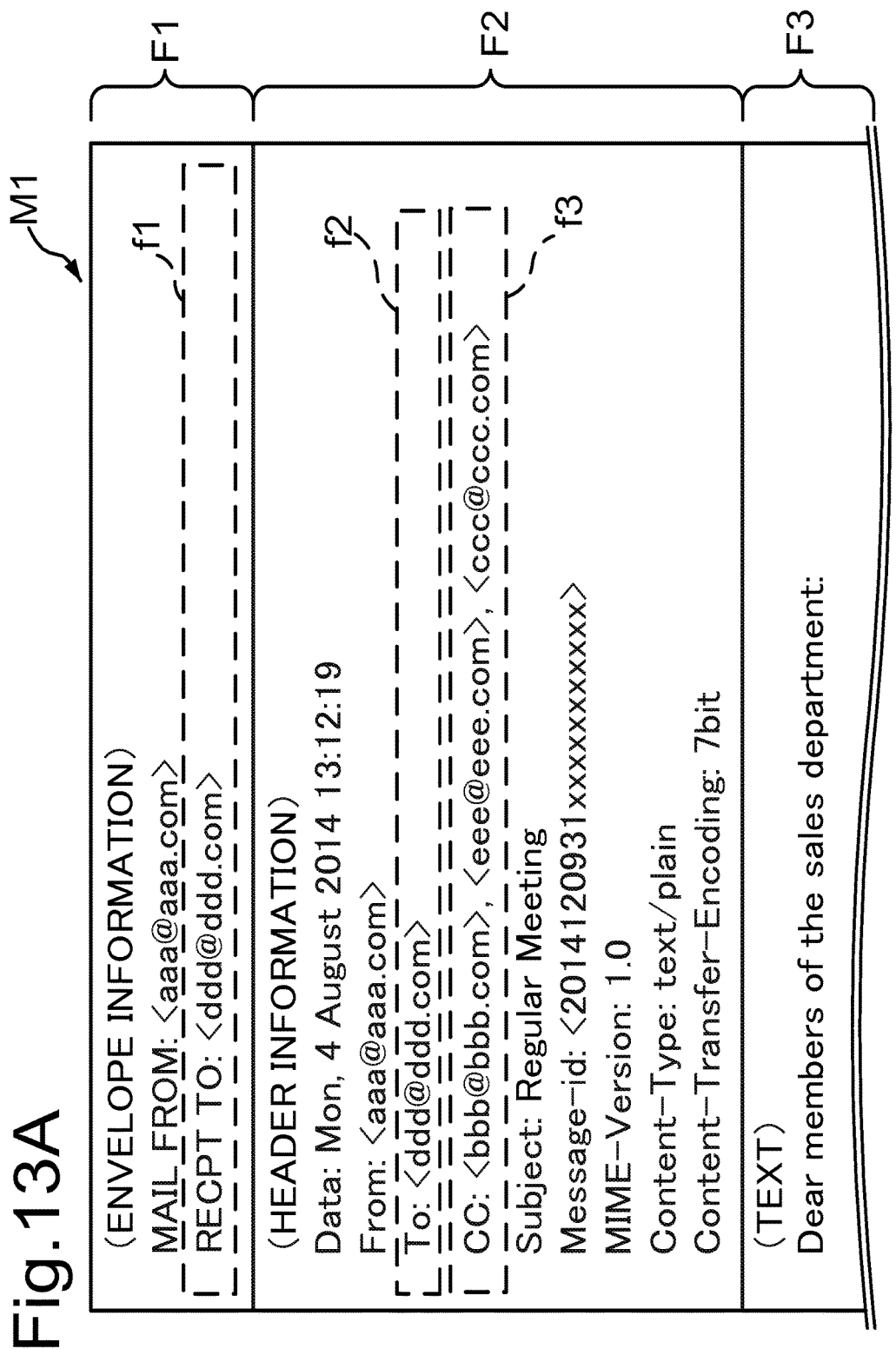
FIGS. 13A and 13B show examples of the content of mail data generated based on information entered through the mail data generation screen shown in FIG. 12.
Figure 13B:
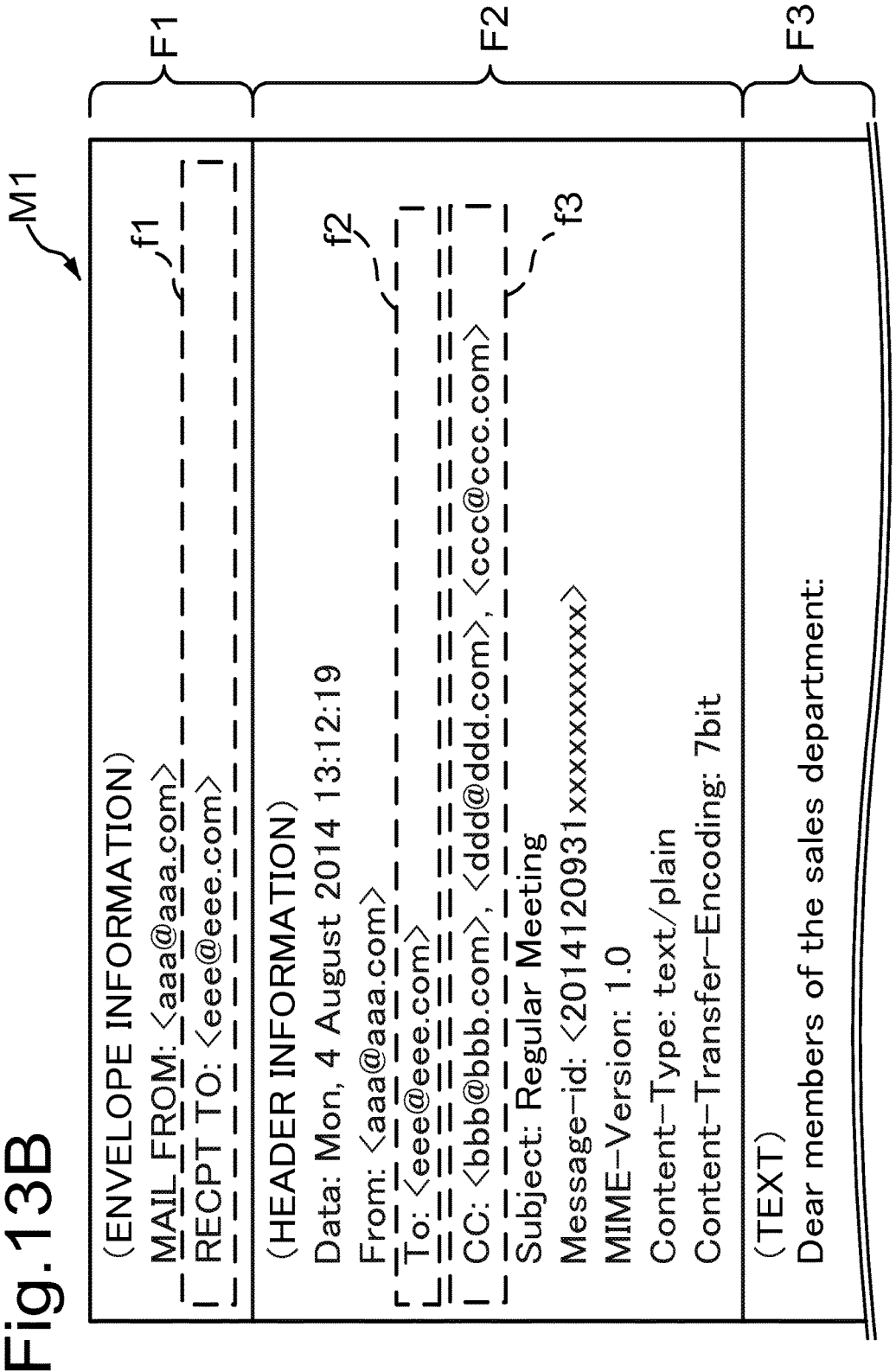

FIGS. 13A and 13B show examples of the content of mail data M1 generated based on information entered through the mail data generation screen D4 shown in FIG. 12. The mail data M1 shown in FIG. 13A is mail data the destination of which is a mail address "ddd@ddd.com" and the RECPT TO information of which contains only the mail address "ddd@ddd.com" (see within the dotted line area f1 in FIG. 13A). Furthermore, the To information of the mail data M1 contains, of the plurality of mail addresses entered in the address entry field d7, only the mail address "ddd@ddd.com" (see within the dotted line area f2 in FIG. 13A). Moreover, the CC information of the mail data M1 contains, of the plurality of mail addresses entered in the address entry field d7, the remaining mail addresses other than the mail address "ddd@ddd.com" (see within the dotted line area f3 in FIG. 13A).

On the other hand, the mail data M1 shown in FIG. 13B is mail data the destination of which is a mail address "eee@eee.com", the RECPT TO information thereof contains only the mail address "eee@eee.com", the To information thereof contains, of the plurality of mail addresses entered in the address entry field d7, only the mail address "eee@eee.com", and the CC information contains the remaining mail addresses other than the mail address "eee@eee.com".

Although the mail data shown in FIG. 13A is a set of mail data the destination of which is the mail address "ddd@ddd.com" and the mail data shown in FIG. 13B is a set of mail data the destination of which is the mail address "eee@eee.com", the mail data generating section 53 generates, in addition to the above two sets of mail data, other two sets of mail data to be delivered to mail addresses "bbb@bbb.com" and "ccc@ccc.com" which are the other mail addresses entered in the address entry field d7 shown in FIG. 12.

As seen from the above, in the mail client 1 according to Embodiment 2, the destination address list information showing a list of destination mail addresses is composed of To information and CC information. The mail addresses contained in the To information are placed earlier in the destination address list information than the mail addresses contained in the CC information. Therefore, in the mail client 1 according to Embodiment 2, it can be said that the mail data generating section 53 generates destination address list information in which one of the plurality of mail addresses entered in the address entry field d7 is placed at the top of the list information, by containing only the one mail address in the To information and containing the remaining mail addresses other than the one mail address in the CC information.

In a mail client having received the mail data M1, whether its own mail address is displayed in the TO address display field d12 or in the CC address display field d13 may have an influence on the degree of user's interest in the received mail data M1. For example, the user is very likely to take a great interest in the mail data M1 in which his/her own mail address is displayed in the TO address display field d12. In contrast, the user may take less interest in the mail data M1 in which his/her own mail address is displayed in the CC address display field d13.

In view of the above, the mail client 1 according to Embodiment 2 can allow each of receiving-side mail clients to display the mail address of the receiving-side mail client itself in the TO address display field d12. As a result, it is possible to make the users of all of the destination mail addresses highly interested in the mail data.

FIG. 14 is a flowchart showing a processing flow of mail data generation processing and transmission processing performed by the mail client 1 according to Embodiment 2. The same pieces of processing as those illustrated in the flowchart shown in FIG. 8 are designated by the same references and further explanation thereof will be omitted.

When the acceptance section 52 accepts a command to send mail data (YES in step S13), the mail data generating section 53 generates, for one of a plurality of mail addresses entered in the address entry field d7, mail data that contains: RECPT TO information indicating the one of the plurality of mail addresses as a destination, To information containing only the one mail address, and CC information containing the remaining mail addresses other than the one mail address (step S24).

The mail data generating section 53 performs the mail data generation processing of step S24 for all the mail addresses entered in the address entry field d7 (step S25).

If mail data has been generated for all of the mail addresses entered in the address entry field d7 (YES in step S25), the communication control section 54 sends the plurality of sets of mail data generated by the mail data generating section 53 via the communication section 11 to the mail server 2A (step S16).

<Supplement>

The description in the above Embodiment 2 has been given of the case where the mail data generation screen D4 displayed on the display 12 of the mail client 1 is not provided with the TO address entry field d1, the CC address entry filed d2, and the BCC address entry field d3 and the acceptance section 52 does not accept any specification of types to which mail addresses belong, including a type of TO address, a type of CC address and a type of BCC address (see FIG. 12). However, the disclosure according to Embodiment 2 is not necessarily limited to this case.

The acceptance section 52 may accept the specification of types of destination address to which mail addresses belong, including a type of TO address and a type of CC address. In this case, in the processing of step S24 shown in FIG. 14, the mail data generating section 53 generates, regardless of whether the acceptance section 52 has accepted the specification of the types of destination address to which mail addresses belong, mail data that contains: RECPT TO information indicating one of the mail addresses as a destination; To information containing only the one mail address; and CC information containing the remaining mail addresses other than the one mail address.

Embodiment 3

In the mail client 1 according to Embodiment 3, priority rankings involved with the display order of mail addresses are previously stored and the order of a plurality of mail addresses contained in To information is sorted based on the priority rankings. Furthermore, if the plurality of mail addresses include those having the same priority ranking, To information is generated in which one of the mail addresses having the same priority ranking is placed higher in the display order than the other mail addresses having the same priority ranking.

Figure 15:
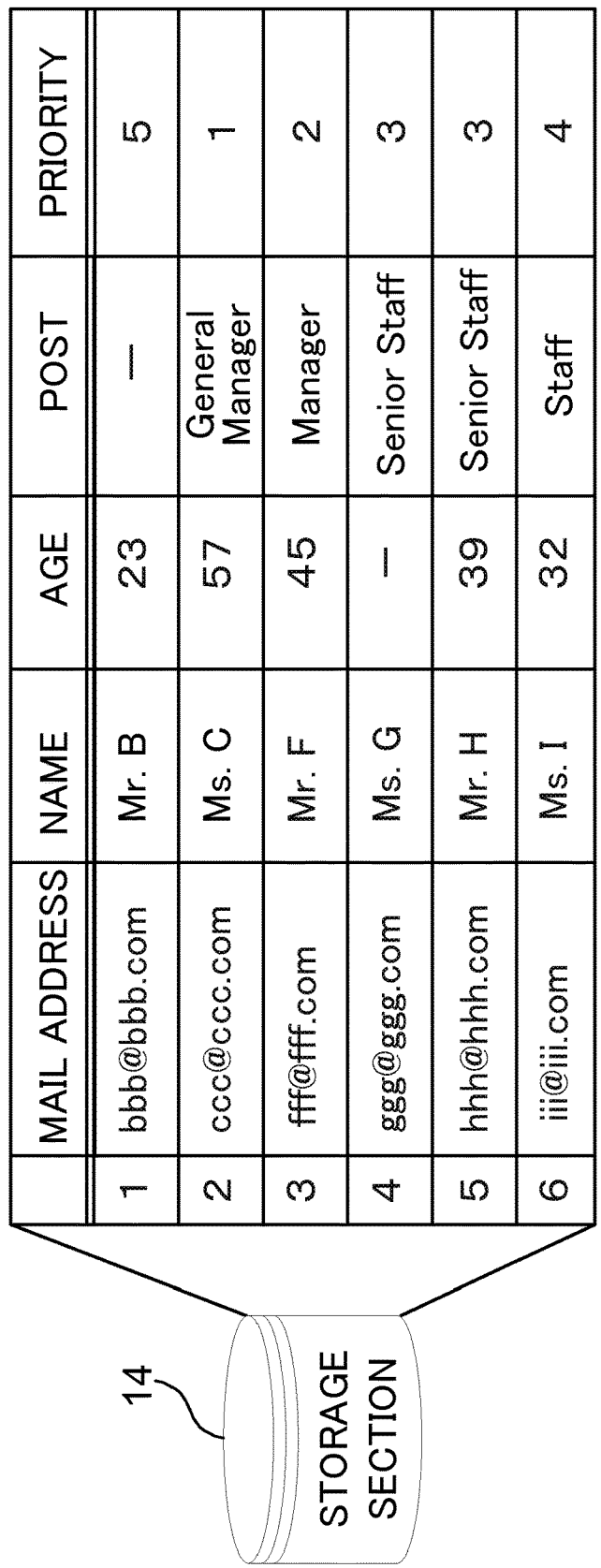
FIG. 15 is a table showing an example of the content of priority rankings involved with the display order of mail addresses stored in a storage section of a mail client according to Embodiment 3.

FIG. 15 is a table showing an example of the content of priority rankings involved with the display order of mail addresses stored in the storage section 14. As shown in FIG. 15, the storage section 14 stores a plurality of mail addresses and their respective sets of accompanying information items attached to the plurality of mail addresses, including name, age, and post. Each set of information items are accepted by the acceptance section 52 based on a user's operation of a mail originator using the operating section 13 in a predetermined operating mode (address book entry mode) of the mail client 1. The acceptance section 52 is configured to allow the storage section 14 to store the accepted set of information items. The control section 51 is configured to determine priority rankings of the plurality of mail addresses based on the sets of accompanying information items, including age and post, stored in the storage section 14 and allow the storage section 14 to store the determined priority rankings. In this case, the control section 51 functions as a priority ranking determining section that determines priority rankings of mail addresses.

The control section 51 determines priority rankings of mail addresses based on respective information items on post attached to the mail addresses so that a mail address accompanied by an information item indicating a higher-ranking post has a higher priority ranking. Furthermore, the control section 51 sets mail addresses accompanied by respective information items indicating equally high-ranking posts to the same priority ranking. In the example shown in FIG. 15, both the information items on post attached to mail addresses "ggg@ggg.com" and "hhh@hhh.com" are "senior staff". Therefore, the control section 51 determines the mail addresses "ggg@ggg.com" and "hhh@hhh.com" to have the same priority ranking.

FIG. 16A shows an example of a mail data generation screen D1 displayed on the display 12 of the mail client 1 according to Embodiment 3. FIG. 16B is a table showing a display order of mail addresses determined based on the priority rankings shown in FIG. 15. The mail data generating section 53 is configured to determine the display order of a plurality of mail addresses entered in the TO address entry field d1 according to the priority rankings stored in the storage section 14. As for the display order of the mail addresses "ggg@ggg.com" and "hhh@hhh.com" having the same priority ranking, it is determined that the mail address "ggg@ggg.com" entered earlier in the TO address entry field d1 is placed higher in the display order than the mail address "hhh@hhh.com".

If a plurality of mail addresses entered in the TO address entry field d1 include those having the same priority ranking, the mail data generating section 53 generates To information in which one of the mail addresses having the same priority ranking is placed higher in the display order than the other mail addresses having the same priority ranking.

Figure 17B:
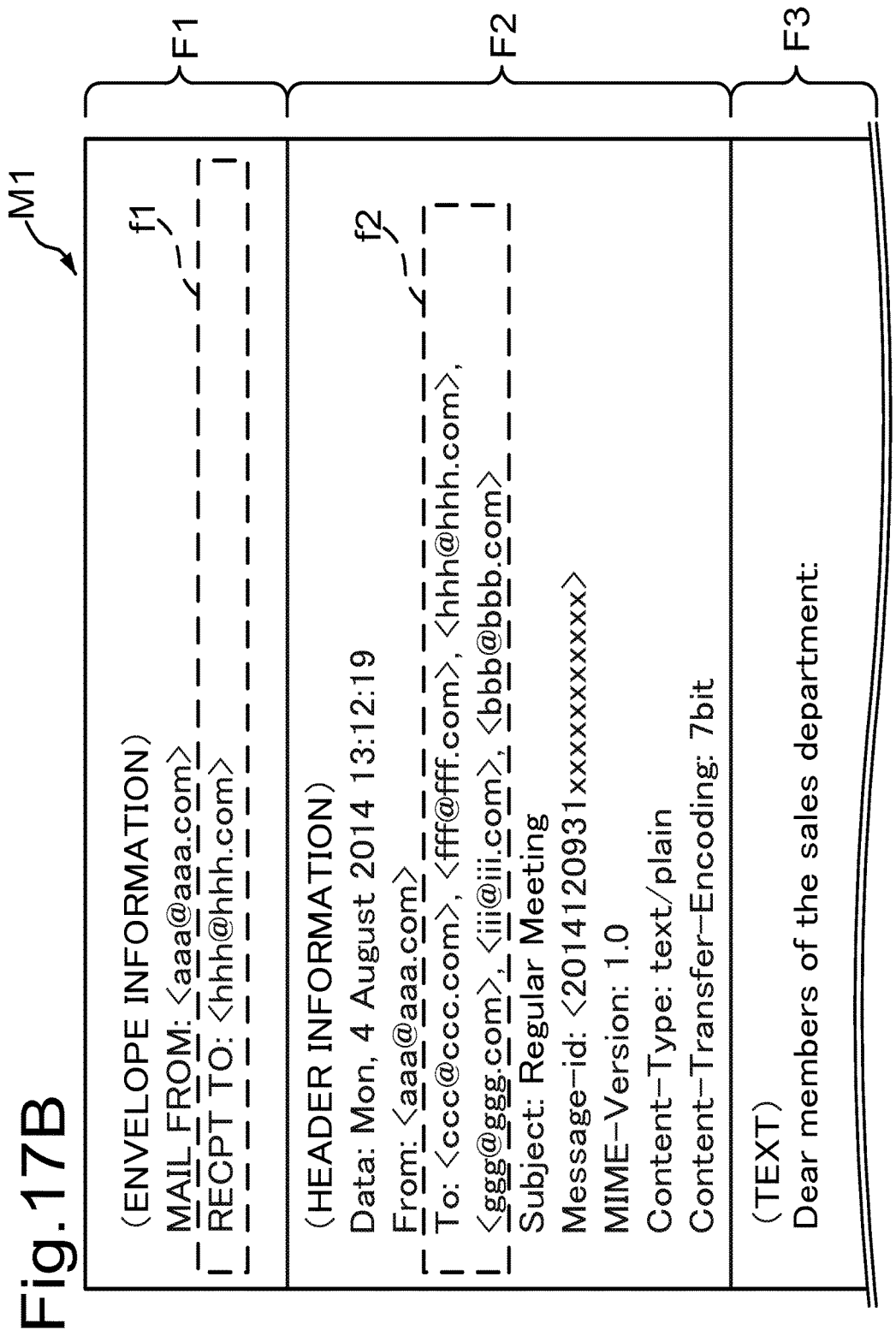

FIGS. 17A and 17B show examples of the content of mail data M1 generated based on information entered through the mail data generation screen D1 shown in FIG. 16A. The mail data M1 shown in FIG. 17A is mail data the destination of which is a mail address "ggg@ggg.com" and the RECPT TO information of which contains only the mail address "ggg@ggg.com" (see within the dotted line area f1 in FIG. 17A). Furthermore, the To information of the mail data M1 contains a list of mail addresses sorted by priority rankings so that the mail address "ggg@ggg.com" is placed higher on the list than the mail address "hhh@hhh.com" (see within the dotted line area f2 in FIG. 17A).

On the other hand, the mail data M1 shown in FIG. 17B is mail data the destination of which is a mail address "hhh@hhh.com" and the RECPT TO information of which contains only the mail address "hhh@hhh.com". Furthermore, the To information of the mail data M1 contains a list of mail addresses obtained by sorting a list of mail addresses arranged in order of entry into the TO address entry field d1 into the order of priority rankings and further reversing the display order of the mail address "hhh@hhh.com" and the mail address "ggg@ggg.com" to place the mail address "hhh@hhh.com" higher on the list than the mail address "ggg@ggg.com".

In this manner, in the mail client 1 according to Embodiment 3, the display order of a list of mail addresses to be displayed on the display of each receiving-side mail client is determined in consideration of post rankings by changing mail addresses accompanied by information items indicating higher-ranking posts to higher positions in the display order and changing mail addresses accompanied by information items indicating lower-ranking posts to lower positions in the display order. Furthermore, as for mail addresses accompanied by information items indicating equally high-ranking posts, To information is generated in which one of the mail addresses having the same priority ranking is placed higher in the display order than the other mail addresses having the same priority ranking. Thus, on each receiving-side mail client, its own mail address can be displayed ahead of the other mail addresses having the same priority ranking in the TO address display field d12. As a result, it is possible to make the user of each of the destination mail addresses highly interested in the mail data.

FIG. 18 is a flowchart showing a processing flow of mail data generation processing and transmission processing performed by the mail client 1 according to Embodiment 3. The same pieces of processing as those illustrated in the flowchart of FIG. 8 are designated by the same references and further explanation thereof will be omitted.

When the acceptance section 52 accepts a command to send mail data (YES in step S13), the mail data generating section 53 determines priority rankings of a plurality of mail addresses entered in the TO address entry field d1, based on sets of accompanying information items, including age and post, stored in the storage section 14 (step S31).

After the processing of step S31, if the plurality of mail addresses entered in the TO address entry field d1 include those having the same priority ranking, the mail data generating section 53 generates To information in which one of the mail addresses having the same priority ranking is placed higher in the display order than the other mail addresses having the same priority ranking (step S32).

The mail data generating section 53 performs the mail data generation processing of step S32 for all the mail addresses having the same priority ranking (step S33).

If mail data has been generated for all of the mail addresses having the same priority ranking (YES in step S33), the communication control section 54 sends the plurality of sets of mail data generated by the mail data generating section 53 via the communication section 11 to the mail server 2A (step S16).

The present disclosure is not limited to the configurations of the above embodiments and can be modified in various ways. For example, the above embodiments and the above modifications may be variously combined.

The communication control program described in the above embodiments and modifications may be one stored on a computer-readable non-transitory recording medium, such as a hard disk, a CD-ROM, a DVD-ROM or a semiconductor memory. In such a case, a computer-readable non-transitory recording medium with the communication control program recorded thereon is one embodiment of the present disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A communication device comprising:
a transmitter configured to transmit and receive data, the transmitter including a communication module and;
a control unit including a memory, a central processing unit (CPU) and, based on operation of the CPU in accordance with a communication control program, the control unit functioning as:
an acceptance section configured to accept a specification of types of destination address to which a plurality of mail addresses belong, the types of destination address including a type of TO address, a type of CC address, a plurality of destination addresses and a mail text to be sent to the plurality of destination addresses; and
a mail data generating section configured to generate, for the plurality of destination addresses, mail data that contains the mail text, destination information indicating one of the plurality of destination addresses as a destination being included in envelope information, and destination address list information which indicates a list of the plurality of destination addresses, and is included in header information, the envelope information and the header information being attached to the mail text,
wherein the list of the plurality of destination addresses includes the one destination address shown at the first of the list, when the mail data is to be sent to an intended recipient to which the one destination address is assigned, and
the transmitter is configured to send each of the mail data generated by the mail data generating section to a mail server with a destination as the destination address indicated by the destination information of each of the mail data.

2. The communication device according to claim 1, wherein
the acceptance section is further configured to accept a specification of types of destination address to which the plurality of mail addresses belong, the types of destination address including a type of TO address and a type of CC address,
the destination address list information contains: TO address list information indicating a list of destination addresses belonging to the type of TO address; and CC address list information indicating a list of destination addresses belonging to the type of CC address, and
the mail data generating section is further configured to:
generate, for one of the destination addresses belonging to the type of TO address, mail data that contains destination information indicating the one of the destination addresses as a destination and the TO address list information in which the one destination address is placed at a top of the list; and generate, for one of the destination addresses belonging to the type of CC address, mail data that contains destination information indicating the one of the destination addresses as a destination and the CC address list information in which the one destination address is placed at a top of the list.

3. The communication device according to claim 1, wherein
the acceptance section is further configured not to accept any specification of types of destination address to which the plurality of mail addresses belong, the types of destination address including a type of TO address and a type of CC address,
the destination address list information contains: TO address list information indicating a list of destination addresses belonging to the type of TO address; and CC address list information indicating a list of destination addresses belonging to the type of CC address, and
the mail data generating section is further configured to generate the destination address list information with the one destination address placed at the top of the list by containing only the one destination address as the destination in the TO address list information and containing the destination addresses other than the one destination address in the CC address list information.

4. The communication device according to claim 1, wherein
the acceptance section is further configured to accept a specification of types of destination address to which the plurality of mail addresses belong, the types of destination address including a type of TO address and a type of CC address,
the destination address list information contains: TO address list information indicating a list of destination addresses belonging to the type of TO address; and CC address list information indicating a list of destination addresses belonging to the type of CC address, and
the mail data generating section is further configured to generate, regardless of whether the acceptance section has accepted the specification of types of destination address, the destination address list information with the one destination address placed at the top of the list by containing only the one destination address as the destination in the TO address list information and containing the destination addresses other than the one destination address in the CC address list information.

5. A communication device comprising:
a transmitter configured to transmit and receive data, the transmitter including a communication module;
a control unit including a memory, a central processing unit (CPU) and, based on operation of the CPU in accordance with a communication control program, the control unit functioning as:
an acceptance section configured to accept a specification of types of destination address to which a plurality of mail addresses belong, the types of destination address including a type of TO address, a type of CC address, a plurality of destination addresses and a mail text to be sent to the plurality of destination addresses; and
a mail data generating section configured to generate, for the plurality of destination addresses, mail data that contains the mail text, destination information indicating one of the plurality of destination addresses as a destination being included in envelope information, and destination address list information which indicates a list of the plurality of destination addresses, and is included in header information, the envelope information and the header information being attached to the mail text, and a storage section configured to store the plurality of destination addresses and priority rankings of the plurality of destination addresses, wherein the list of the plurality of destination addresses includes the one destination address shown at the first of the list, when the mail data is to be sent to an intended recipient to which the one destination address is assigned, the mail data generating section is further configured to change an order of the plurality of destination addresses contained in the destination address list information based on the priority rankings and generate, when the plurality of destination addresses include destination addresses having the same priority ranking as the one of the destination addresses included in the destination information, the destination address list information in which the one of the destination addresses having the same priority ranking is placed higher in order than the other destination addresses having the same priority ranking, and the transmitter is configured to send each of the mail data generated by the mail data generating section to a mail server with a destination as the destination address indicated by the destination information of each of the mail data.

6. The communication device according to claim 5, wherein the storage section is further configured to store respective accompanying information items attached to the plurality of destination addresses, and the communication device further comprises a priority ranking determining section configured to determine the priority rankings of the plurality of destination addresses based on the accompanying information items.

7. The communication device according to claim 1, further comprising a display and a display control section configured to control a display operation of the display, wherein in allowing the display to display mail data once sent by the transmitter, the display control section allows the display to display, if an order of the plurality of destination addresses contained in the destination address list information of the mail data is changed from an order of the plurality of destination addresses when accepted by the acceptance section, information indicating that the order of the plurality of destination addresses contained in the destination address list information is changed, together with the mail data.

8. The communication device according to claim 1, further comprising:

a storage section; and a control section configured to, when the transmitter sends mail data in which an order of the plurality of destination addresses contained in the destination address list information is changed from an order of the plurality of destination addresses when accepted by the acceptance section, allow the storage section to store information indicating that the order of the plurality of destination addresses contained in the destination address list information is changed, together with the sent mail data.

9. A computer-readable non-transitory recording medium with a communication control program recorded thereon, the communication control program allowing a computer to function as:

an acceptance section configured to accept a specification of types of destination address to which the plurality of mail addresses belong, the types of destination address including a type of TO address, a type of CC address, a plurality of destination addresses and a mail text to be sent to the plurality of destination addresses;

a mail data generating section configured to generate, for the plurality of destination addresses, mail data that contains the mail text, destination information indicating one of the plurality of destination addresses as a destination being included in envelope information, and destination address list information which indicates a list of the plurality of destination addresses, and is included in header information, the envelope information and the header information being attached to the mail text, the list of the plurality of destination addresses including the one destination address shown at the first of the list, when the mail data is to be sent to an intended recipient to which the one destination address is assigned; and a communication control section configured to allow a transmitter to send each of the mail data generated by the mail data generating section to a mail server with a destination as the destination address indicated by the destination information of each of the mail data.

* * * * *